(12) United States Patent
Otto et al.

(10) Patent No.: US 7,467,335 B2
(45) Date of Patent: Dec. 16, 2008

(54) METHOD AND APPARATUS FOR SYNCHRONIZING DATA CHANNELS USING AN ALTERNATING PARITY DESKEW CHANNEL

(75) Inventors: Klaus-Holger Otto, Nuremberg (DE); Thomas Link, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 439 days.

(21) Appl. No.: 11/173,336

(22) Filed: Jul. 1, 2005

(65) Prior Publication Data
US 2007/0006053 A1    Jan. 4, 2007

(51) Int. Cl.
G06K 5/04    (2006.01)
G11B 5/00    (2006.01)
G11B 20/20   (2006.01)
G06F 11/00   (2006.01)
H03M 11/00   (2006.01)

(52) U.S. Cl. .................. 714/700; 714/798; 714/802
(58) Field of Classification Search ............... 714/700, 714/798, 802
See application file for complete search history.

(56) References Cited

U.S. PATENT DOCUMENTS 4,346,474 A * 8/1982 Sze .................... 714/802
4,667,324 A * 5/1987 Graves ................ 370/538
6,829,315 B1 12/2004 Cruikshank

FOREIGN PATENT DOCUMENTS

| EP | 1 289 212 A | 3/2003 |
| EP | 1 355 465 A | 10/2003 |
| WO | US2006/025727 | 10/2006 |

OTHER PUBLICATIONS

"Serdes Framer Interface Level 5 (SFI-5): Implementation Agreement for 40Gb/s Interface for Physical Layer Devices," Implementation Agreement OIF-SFI5-01.0, OIF Optical Internetworking Forum, OIF-SFI5-01.02, Optical Internetworking Forum, Jan. 29, 2002.

* cited by examiner

Primary Examiner—Joseph D Torres

(57) ABSTRACT

The invention includes a method and apparatus for aligning a plurality of data channels using a deskew bitstream. The method includes receiving the deskew bitstream, identifying an aligned deskew frame by processing the deskew bitstream, identifying a data channel alignment position associated with each of the plurality of data channels by comparing a deskew channel comparison bit from the aligned deskew frame to a data channel comparison bit from each of the plurality of data channels, and selecting the plurality of data channel alignment positions associated with the respective plurality of data channels for aligning the plurality of data channels. The plurality of data channels are aligned in a manner for substantially reducing skew associated with the data channels. The deskew bitstream comprises a plurality of data bits associated with the data channels and a plurality of parity bits generated using at least a portion of the data bits.

15 Claims, 11 Drawing Sheets

500

US 7,467,335 B2

METHOD AND APPARATUS FOR SYNCHRONIZING DATA CHANNELS USING AN ALTERNATING PARITY DESKEW CHANNEL

FIELD OF THE INVENTION

The invention relates to the field of communication networks and, more specifically, to the synchronization of data lines using a deskew channel.

BACKGROUND OF THE INVENTION

A SERDES framer interface is the electrical interface between an optical module (i.e., a transponder) and a complementary metal-oxide semiconductor (CMOS) application-specific integrated circuit (ASIC) framer. This SERDES framer interface is currently handled using sixteen 2.5 gigabit per second (i.e., 16×2.5 Gbps) differential data lines together with one 2.5 Gbps deskew channel, as specified in the Optical Internetworking Forum (OIF) SFI-5 standard. According to the OIF SFI-5 standard, the data samples transmitted over the deskew channel are headed by a 64-bit header. The deskew channel header includes two A1 bytes (F6) and two A2 bytes (62) for framing, as well as four overhead bytes (EH1-4).

Following the transmission of the 64-bit deskew channel header, 64 bit samples from each of the 16 data lines are transmitted over the deskew channel (e.g., 64 bit samples from data line 15 are transmitted, 64 bit samples from data line 14 are transmitted, and so on, until 64 bit samples from data line zero are transmitted over the deskew channel). Disadvantageously, the OIF SFI-5 SERDES framer interface is difficult to implement. For example, the implementation effort, in terms of the required number of logic gates, is significantly high. As such, effective implementation of this approach in a high-speed ASIC technology (such as SiGe, InP, and the like) is expensive due to the associated power consumption of this implementation.

SUMMARY OF THE INVENTION

Various deficiencies in the prior art are addressed through the invention of a method and apparatus for aligning a plurality of data channels using a deskew bitstream. Specifically, a method according to one embodiment of the invention includes receiving the deskew bitstream, identifying an aligned deskew frame by processing the deskew bitstream, identifying a data channel alignment position associated with each of the plurality of data channels by comparing a deskew channel comparison bit from the aligned deskew frame to a data channel comparison bit from each of the plurality of data channels, and selecting the plurality of data channel alignment positions associated with the respective plurality of data channels for aligning the plurality of data channels.

The plurality of data channels are aligned in a manner for substantially reducing skew associated with the data channels. The deskew bitstream comprises a plurality of data bits associated with the data channels and a plurality of parity bits generated using at least a portion of the data bits. By employing a bit-oriented framing scheme (using alternating odd-even parity bits), as opposed to a byte-oriented framing scheme (using A1/A2 bytes) defined in the OIF SFI-5 standard, the present invention enables deskewing of data lines in a simpler, more efficient, more reliable, and more cost-effective manner. Furthermore, the present invention provides a guaranteed toggle rate on the deskew channel using the alternating odd-even parity bits.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a communication system including a SERDES framer interface having four 10 Gbps data lines; however, the present invention can readily be applied to other communications interfaces operable for utilizing deskew for synchronizing data lines. In general, the present invention comprises a power-optimized solution for synchronization of data lines using a deskew channel. In the present invention, use of a bit-oriented sampling method and alternating odd-even parity as a deskew framing marker, enables synchronization of data lines with significantly less power consumption. The use of the bit-oriented sampling method, and the alternating odd-even parity as a deskew framing marker, significantly reduces the number of logic gates required for implementing the improved data line synchronization methodologies of the present invention in SiGe, InP, and like technologies.

As such, since the present invention may be implemented using a significantly smaller number of logic gates than previously required for synchronizing data line, the present invention thereby significantly reduces the power consumption required for synchronizing the data lines. Furthermore, in one embodiment, as primarily described herein, the present invention limits the maximum number of consecutive identical digits on the deskew channel to nine, thereby rendering the deskew channel as the best source for overall clock distribution within the SERDES device.

Figure 1:
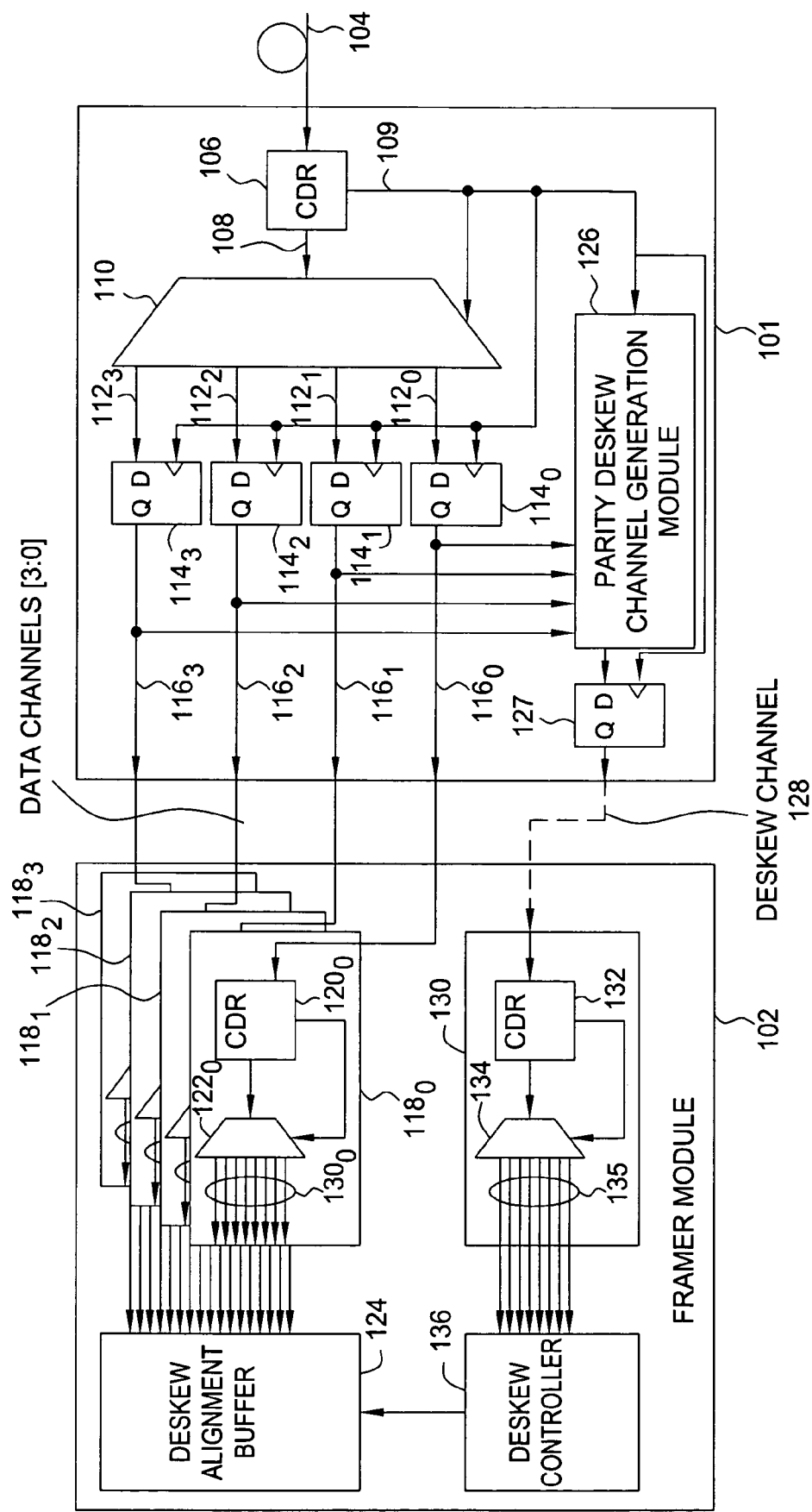
FIG. 1 depicts a high-level block diagram of a deskew channel generation system including a serializer-deserializer and a framer module.

FIG. 1 depicts a high-level block diagram of a deskew channel generation system including a serializer-deserializer and a framer module. Specifically, deskew channel generation system 100 of FIG. 1 comprises a serializer-deserializer (SERDES) 101 and a framer module (FM) 102. In one embodiment, SERDES 101 comprises a SiGe SERDES. In another embodiment, SERDES 101 comprises an InP SERDES. In one embodiment, FM 102 comprises a CMOS framer module. As depicted in FIG. 1, the output ports of SERDES 101 are coupled to respective input ports of FM 102.

As depicted in FIG. 1, SERDES 101 comprises a clock data recovery (CDR) 106, a demultiplexer (DEMUX) 110, a plurality of registers $114_0$-$114_3$ (collectively, registers 114), a parity deskew channel generation module (PDCGM) 126, and a register 127. As depicted in FIG. 1, FM 102 comprises a plurality of receive data framer modules (RDFMs) $118_0$-$118_3$ (collectively, RDFMs 118), a deskew alignment buffer (DAB) 122, a receive deskew channel framer module (RD-CFM) 130, and a deskew controller (DC) 136. Although depicted as comprising D-type flip-flops, registers 114 and register 127 may be implemented using various other storage components.

As depicted in FIG. 1, SERDES 101 receives a serial data stream from an optical module (not shown) using serial input link (SIL) 104. The SIL 104 is coupled to the input port of CDR 106. The CDR 106 receives the serial data stream over SIL 104 and processes the received serial data stream. The CDR 106 performs data recovery functions and clock recovery functions as known in the art. A first output port of CDR 106 is coupled to an input port of DEMUX 110 by a data signal connection (DSC) 108. The CDR 106 sends the recovered data signal to DEMUX 110 over DSC 108. A second output port of CDR 106 is coupled to a clock input port of DEMUX 110, respective clock input ports of each of the registers 114, a clock input port of PDCGM 126, and a clock input port of register 127 by a clock signal connection (CSC) 109. The CDR 106 sends the recovered clock signal over CSC 109. The CDR 106 sends the recovered clock signal to DEMUX 110 for controlling the flow of data through DEMUX 110. Similarly, CDR 106 sends the recovered clock signal to each of the registers 114 for controlling input of data to registers 114 and reading of data from registers 114. The CDR 106 sends the recovered clock signal to PDCGM 126 for use in generating the deskew channel. The CDR 106 sends the recovered clock signal to register 127, which receives the deskew channel bitstream output by PDCGM 126.

As depicted in FIG. 1, DEMUX 110 receives the recovered data stream from CDR 106 as a serial bitstream over DSC 108. In one embodiment, the received data bitstream comprises a 40 Gbps bitstream. The DEMUX 110 receives the recovered clock signal from CDR 106 over CSC 109. In one embodiment, as depicted in FIG. 1, DEMUX 110 comprises a one-to-four demultiplexer. Although depicted as comprising a one-to-four demultiplexer, those skilled in the art will appreciate that various other demultiplexer logic may be used for implementing DEMUX 110, depending on the number of data channels. The DEMUX 110 demultiplexes the received serial bitstream to produce a plurality of data channels (DCs) $112_0$-$112_3$ (collectively, DCs 112). The four output ports of DEMUX 110 are coupled to the data input ports of registers $114_0$-$114_3$, respectively. The DEMUX 110 sends the DCs $112_0$-$112_3$ to registers $114_0$-$114_3$, respectively.

The registers $114_0$-$114_3$ receive the demultiplexed data bitstreams associated with DCs $112_0$-$112_3$, respectively. The registers $114_0$-$114_3$ store each bit of the demultiplexed data bitstreams for one clock cycle. The input of bits associated with DCs $112_0$-$112_3$ to registers $114_0$-$114_3$ and output of bits associated with DCs $116_0$-$116_3$ from registers $114_0$-$114_3$ is controlled using the recovered clock signals received from CDR 106. The output ports of registers $114_0$-$114_3$ are coupled to input ports of RDFMs $118_0$-$118_3$, respectively. The registers $114_0$-$114_3$ send the data received from DEMUX 110 over DCs $112_0$-$112_3$ to a respective plurality of data channels (DCs) $116_0$-$116_3$ (collectively, DCs 116) for transmission towards respective RDFMs $118_0$-$118_3$ of FM 102. The bits output by registers 114 to respective DCs 116 are provided to respective input ports of PDCGM 126 for use in deskew channel generation.

The data bitstreams transmitted over DCs $116_0$-$116_3$ are received by RDFMs $118_0$-$118_3$, respectively. As depicted in FIG. 1, RDFMs $118_0$-$118_3$ comprise a respective plurality of CDRs $120_0$-$120_3$ (collectively, CDRs 120) and a respective plurality of demultiplexers (DEMUX) $122_0$-$122_3$ (collectively, DEMUXs 122). As such, the data bitstreams transmitted over DCs $116_0$-$116_3$ are received by CDRs $120_0$-$120_3$, respectively. The CDRs $120_0$-$120_3$ perform data recovery functions and clock recovery functions on each of the data bitstreams associated with DCs $116_0$-$116_3$, respectively. The output ports of the CDRs $120_0$-$120_3$ are coupled to the input ports of the DEMUXs $122_0$-$122_3$, respectively. The CDRs $120_0$-$120_3$ send the recovered data signals to DEMUXs $122_0$-$122_3$, respectively.

The CDRs $122_0$-$122_3$ output recovered clock signals to DEMUXs $122_0$-$122_3$ for controlling de-multiplexing of the respective data bitstreams by DEMUXs $122_0$-$122_3$, respectively. The DEMUXs 122 demultiplexes received DCs 116 to a data rate required by FM 102 based on the capabilities of the standard cell CMOS device on which FM 102 is disposed. As such, although depicted as comprising one-to-eight demultiplexers for purposes of clarity, those skilled in the art will appreciate that DEMUXs 122 may comprises 1:32 demultiplexers, 1:16 demultiplexers, and various other demultiplexing logic, depending on the rate of DCs 116 output by SERDES 101, data rated capable of being processed by FM 102, and like factors.

As depicted in FIG. 1, each of DEMUXs $122_0$-$122_3$ outputs a respective plurality of output data bitstreams (ODBs) $123_0$-$123_3$ (collectively, ODBs 123). The output ports of DEMUXs $122_0$-$122_3$ are coupled to respective input ports of DAB 124. In particular, ODBs $123_0$-$123_3$ output by RDFMs $118_0$-$118_3$ are sent to DAB 122. As depicted in FIG. 1, DAB 124 is controlled by DC 136, which is in turn controlled using the deskew channel bitstream generated by PDCGM 126 in SERDES 101.

As depicted in FIG. 1, PDCGM 126 receives data bits from each of the data bitstreams output by registers $114_0$-$114_3$ onto DCs $116_0$-$116_3$, respectively, and receives the recovered clock signal from CDR 106. The PDCGM 126 generates a deskew data bitstream using data bits from the DCs 116 and the clock signals output by CDR 106 using CSC 109. In one embodiment, the deskew data bitstream comprises alternating odd parity bits and even parity bits, where each of the parity bits is generated using one sample bit from each of the DCs $116_0$-$116_3$, respectively. In one such embodiment, the generated odd parity bits and even parity bits are inserted into the deskew data bitstream in such a manner that the parity bits are interleaved with the sample data bits from the DCs 116 used for generating the parity bits. As such, in one embodiment, PDCGM 126 performs at least a portion of the methodologies of the present invention for generating a deskew bitstream. The output port of PDCGM 126 is coupled to the data input port of register 127.

The PDCGM 126 sends the generated deskew bitstream to register 127. The bits of the deskew bitstream are stored in register 127 for one clock cycle. The bits of the deskew bitstream are read out of register 127 for transmission over a deskew channel 128 using clocking signals recovered by CDR 106. The output port of register 127 is coupled to the input port of DCFM 130. As such, the deskew bitstream transmitted from SERDES 101 using deskew channel 128 is received by the DCFM 130 of FM 102. As depicted in FIG. 1, DFM 130 comprises a CDR 132 and a demultiplexer (DE-MUX) 134. The input port of CDR 132 receives the deskew bitstream transmitted over deskew channel 128.

The CDR 132 performs data recovery functions and clock recovery functions to recover the data signal and the associated clock from the received deskew bitstream. The data output port and clock output port of CDR 132 is coupled to the data input port and clock input port of DEMUX 134, respectively. The CDR 132 sends the recovered data signal to DEMUX 134. The CDR 132 outputs the recovered clock signal to DEMUX 134 for controlling demultiplexing of the deskew bitstream by DEMUX 134. As depicted in FIG. 1, DEMUX 134 comprises a one-to-eight demultiplexer. Although depicted as a one-to-eight demultiplexer, those skilled in the art will appreciate that the DEMUX 134 may be implemented using various other demultiplexer logic as known in the art (e.g., 1:16, 1:32, and the like logic) depending on the number of bits used for implementing the deskew channel and the associated deskew channel alternating odd-even parity. Thus, the DEMUX 134 outputs a plurality of deskew data bits (DDBs) 135 (collectively, DDBs 135). The output ports of DEMUX 134 are coupled to respective input ports of DC 136. The DDBs 135 output by DEMUX 134 are input to DC 136 for controlling DAB 124.

As described herein, the deskew bitstream is operable for controlling DAB 124, synchronizing the data channels from which the deskew bitstream is generated, and performing like functions. In one embodiment, PDCGM 126 receives data samples from the DCs 116 and processes the received data samples from DCs 116 for generating alternating parity bits (i.e., alternating between generation of odd parity bits and even parity bits). The PDCGM 126 multiplexes the data samples from DCs 116 with the generated alternating parity bits for transmission over deskew channel 128 as a deskew bitstream. In one embodiment, an odd parity bit is generated by PDCGM 126 using one bit from each of the DCs 116. Similarly, in one embodiment, the even parity bit is generated by PDCGM 126 using one bit from each of the DCs 116. In one embodiment, the odd parity bit generated by PDCGM 126 is inserted into the deskew bitstream in a bit position immediately following the four bit samples obtained from the respective DCs $116_0$-$116_3$ for use in generating the odd parity bit. Similarly, in one embodiment, the even parity bit generated by PDCGM 126 is inserted into the deskew bitstream in a bit position immediately following the four bit samples obtained from the respective DCs $116_0$-$116_3$ for use in generating the even parity bit.

It is contemplated that at least a portion of the functions described with respect to FIG. 1 may be combined into fewer functional elements. Similarly, it is contemplated that the various functions described with respect to FIG. 1 may be performed by other functional elements, or that the various functions may be distributed across the various functional elements in a different manner. For example, in one embodiment, at least a portion of the CDRs depicted and described with respect to FIG. 1 (e.g., CDRs 120 used in the parallel interface between SERDES 101 and FM 102) may be replaced by respective delay locked loops (DLLs). Furthermore, various functions of the present invention depicted and described with respect to FIG. 1 may be performed by replacing functional elements depicted and described with respect to FIG. 1 with various combinations of other functional elements.

Figure 2:
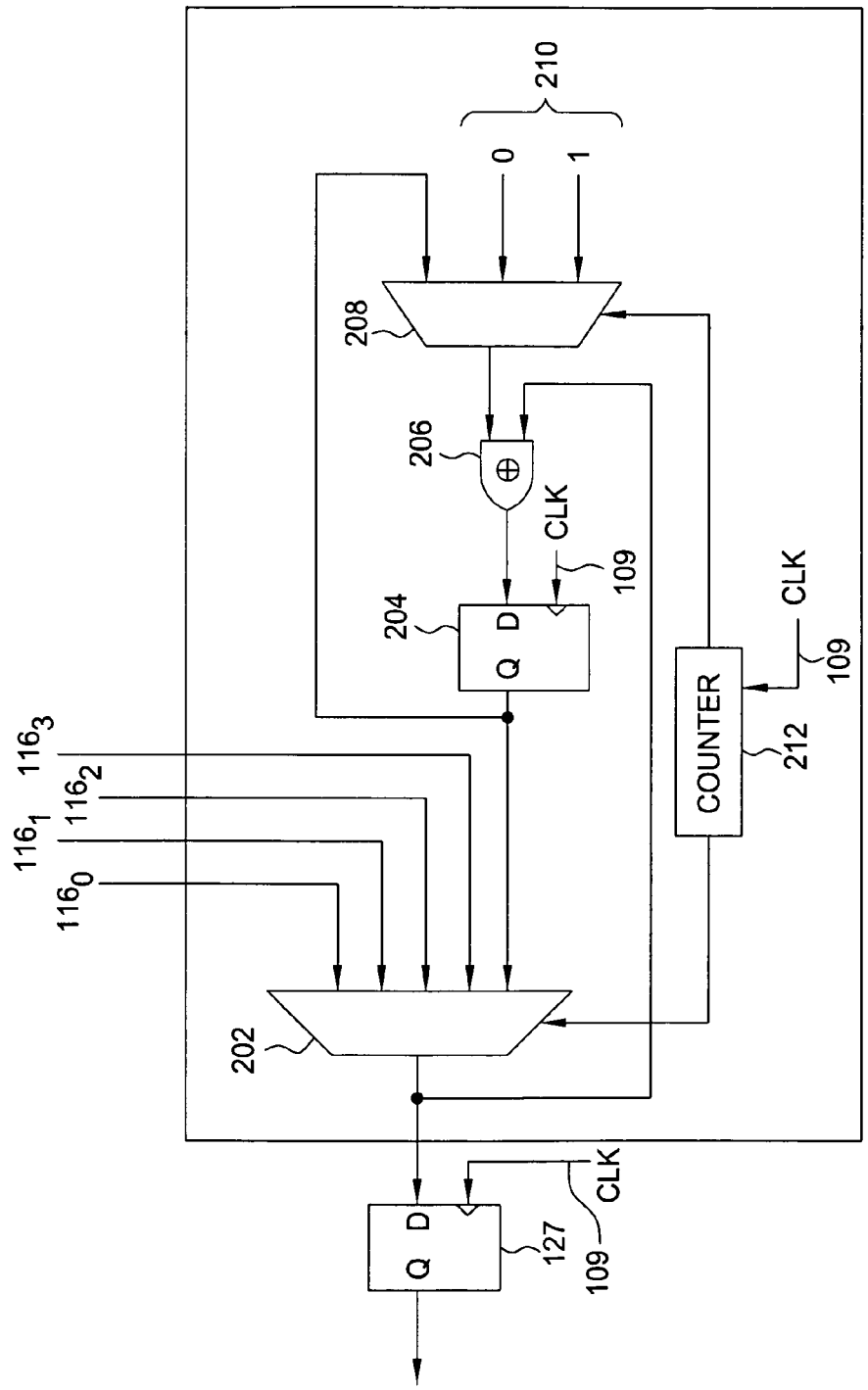
FIG. 2 depicts a high-level block diagram of the parity deskew channel generation module of FIG. 1.

FIG. 2 depicts a high-level block diagram of the parity deskew channel generation module of FIG. 1. Specifically, PDCGM 126 comprises a multiplexer (MUX) 202, a register 204, an XOR logic gate 206, a multiplexer (MUX) 208, and a counter 212. As depicted in FIG. 2, the output ports of registers $114_0$-$114_3$ are coupled to respective input ports of MUX 202 using DCs $116_0$-$116_3$, respectively, and the output port of register 204 is coupled to a fifth input port of MUX 202. The output port of MUX 202 is coupled to the data input port of register 127 and, furthermore, as a feedback loop, to a first input port of XOR logic gate 206. The output port of register 204, in addition to being coupled to the fifth input port of MUX 202, is coupled to an input port of MUX 208. Furthermore, a "0" initialization signal and a "1" initialization signal are coupled to respective input ports of MUX 208 for initializing operation of the PDCGM 126 prior to steady-state operation of PDCGM 126. The output port of MUX 208 is coupled to a second input port of XOR logic gate 206. The output port of XOR logic gate 206 is coupled to the data input port of register 204. As described herein, the output port of register 204 is coupled to both the fifth input port of MUX 202 and an input port of MUX 208. The register 204 is controlled using a clock signal applied to an associated clock input port. Illustratively, a clock signal recovered by CDR 106 is provided to the clock input ports of register 204, counter 212, and register 127 using CDC 109. The output of counter 212 is provided as in input control signal to MUX 202 and MUX 208. In the embodiment depicted in FIG. 2, counter 212 comprises a four-bit counter. The counter 212 controls selection of data samples by MUX 202 from associated DCs $116_0$-$116_3$ for transmission over deskew channel 128 and for use in generating the alternating parity bits for transmission over deskew channel 128. The counter 212 controls the alternating of parity between generation of odd parity bits and generation of even parity bits.

As depicted in FIG. 2, MUX 202 receives as input a one-bit data sample from each of the DCs $116_0$-$116_3$, and a parity bit output from register 204. The MUX 202 multiplexes the four one-bit data samples received from respective DCs $116_0$-$116_3$ with the parity bit (alternating between an odd parity bit and an even parity bit) output from register 204. As described herein, counter 212 controls the multiplexing functions of MUX 202. The output of MUX 202 (i.e., the deskew bitstream) is sent to both the data input port of register 127 for transmission over deskew channel 128, and to the second input port of XOR logic gate 206. The output of MUX 208 is input to the first input port of XOR logic gate 206. The XOR logic gate 206 performs an XOR function on the output of MUX 202 and the output of MUX 208. The output of the MUX 208 is used for determining the type of parity bit to be computed (i.e., whether the odd parity bit or even parity bit is computed using the four one-bit data samples from DCs $116_0$-$116_3$, respectively. The output of MUX 202 is used by XOR logic gate 206 for determining the value of the parity bit. In one embodiment, MUX 208 uses initialization bits for determining the type of parity bit to be computed prior to steady-state operation of PDCGM 126.

The output generated by XOR logic gate 206 comprises a deskew parity bit for inclusion in the deskew bitstream. The parity bit generated by XOR logic gate 206 is sent to register 204. The register 204 stores the parity bit prior to multiplexing of the parity bit with the four one-bit data samples received from DCs $116_0$-$116_3$, respectively. Although depicted as a D-type flip-flop, register 204 may be implemented using any component operable for providing a similar temporary storage function. Thus, as depicted in FIG. 2, PDCGM 126 generates alternating parity bits (alternating between an even parity bit and an odd parity bit), and multiplexes the generated alternating parity bits with the one-bit data samples from which the alternating parity bits are generated, respectively, to produce the deskew bitstream for serial transmission over deskew channel 128. In one embodiment, the deskew bitstream is operable for controlling various control modules and buffer modules for synchronizing the data channels sampled during creation of the deskew bitstream.

Figure 3:
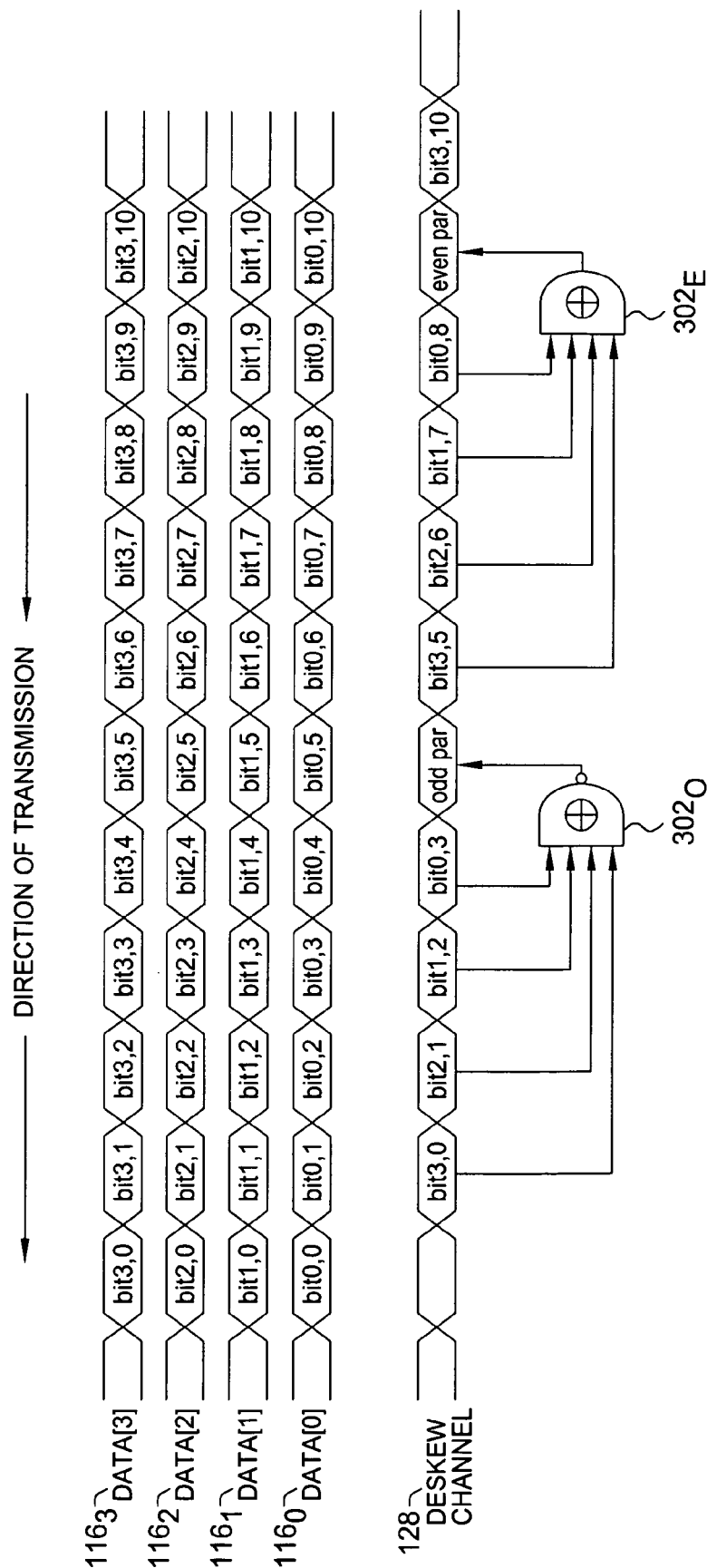
FIG. 3 depicts a logical representation of parallel parity deskew channel generation according to the parity deskew channel generation module of FIG. 2.

FIG. 3 depicts a logical representation of parallel deskew channel generation according to the parity deskew channel generation module of FIG. 2. Specifically, logical representation of parallel deskew channel generation 300 of FIG. 3 comprises DCs $116_0$-$116_3$ and deskew channel 128. As depicted in FIG. 3, direction of transmission (with respect to transmission over a data line) is from right to left (where clock cycle 0 is the first clock cycle). In particular, eleven bits output from the output ports of registers 114 and transmitted over respective DCs 116 are depicted. For example, the eleven data bits depicted as being transmitted over DC $116_3$ include eleven bits denoted as bit (3,0) through bit (3,10). Similarly, for example, the eleven data bits depicted as being transmitted over DC $116_2$ include eleven bits denoted as bit (2,0) through bit (2,10). Similarly, for example, the eleven data bits depicted as being transmitted over DC $116_1$ include eleven bits denoted as bit (1,0) through bit (1,10). Similarly, for example, the eleven data bits depicted as being transmitted over DC $116_0$ include eleven bits denoted as bit (0,0) through bit (0,10). As depicted in FIG. 3, DCs 116 are synchronized such that bits (3,0), (2,0), (1,0), and (0,0) associated with DCs $116_3$-$116_0$, respectively, are time aligned, bits (3,1), (2,1), (1,1), and (0,1) associated with DCs $116_3$-$116_0$, respectively, are time aligned and, similarly, other data bits associated with DCs $116_3$-$116_0$, respectively, are time aligned.

Since the present invention is primarily depicted and described herein with respect to synchronization of four data channels, as depicted in FIG. 3, every fifth bit transmitted over each of DCs $116_3$-$116_0$ is selected for transmission over deskew channel 128. As such, every fifth bit transmitted over each of DCs $116_3$-$116_0$ is used for generation of the alternating parity bit that is interleaved with the sampled data bits to form the deskew bitstream transmitted over deskew channel 128. In one embodiment, as depicted in FIG. 3, the generated parity bit is inserted into the deskew bitstream in the bit position immediately following the four bit positions associated with the four sample bits (from DCs $116_3$-$116_0$, respectively) used to generate that alternating parity bit.

With respect to generation of an odd parity bit, as depicted in FIG. 3, bit (3,0) sampled from DC $116_3$, bit (2,1) sampled from DC $116_2$, bit (1,2) sampled from DC $116_1$, and bit (0,3) sampled from DC $116_0$ are multiplexed to form a portion of the deskew bitstream for serial transmission over deskew channel 128. Furthermore, as depicted in FIG. 3, sampled bits (3,0), (2,1), (1,2), and (0,3) are provided as inputs to respective input ports of an XNOR logic gate $302_O$ for generating an odd parity bit which is inserted into the deskew bitstream transmitted over deskew channel 128. As depicted in FIG. 3, the generated odd parity bit is inserted into the deskew bit stream in a bit position immediately following the four data bits sampled from DCs $116_3$-$116_1$, respectively, to generate the odd parity bit.

With respect to generation of an even parity bit, as depicted in FIG. 3, bit (3,5) sampled from DC $116_3$, bit (2,6) sampled from DC $116_2$, bit (1,7) sampled from DC $116_1$, and bit (0,8) sampled from DC $116_0$ are multiplexed to form a portion of the deskew bitstream for serial transmission over deskew channel 128. Furthermore, as depicted in FIG. 3, sampled bits (3,5), (2,6), (1,7), and (0,8) are provided as inputs to respective input ports of an XOR logic gate $302_E$ for generating an even parity bit which is inserted into the deskew bitstream transmitted over deskew channel 128. As depicted in FIG. 3, the generated even parity bit is inserted into the deskew bit stream in a bit position immediately following the four data bits sampled from DCs $116_3$-$116_1$, respectively, to generate the even parity bit.

As described herein, processing of the deskew bitstream for synchronizing the associated data channels used in generating the deskew bitstream is performed on ten-bit deskew frames. Since the deskew bits of the deskew bitstream are advanced bit-by-bit, processing is performed at each clock cycle for determining whether the ten bits processed during that clock cycle comprise deskew bits from a single ten-bit deskew frame (i.e., an aligned ten-bit deskew frame) or deskew bits from different ten-bit deskew frames (i.e., unaligned ten-bit deskew frames). In one embodiment, an aligned ten-bit deskew frame comprises the four data bits sampled for generating the odd parity bit, the odd parity bit, the four data bits sampled for generating the even parity bit, and the even parity bit. Upon detection of an aligned ten-bit deskew frame, synchronization processing may be performed for synchronizing the data channels used for generating that aligned ten-bit deskew frame. Although described herein with respect to a ten-bit deskew frame (i.e., due to the use of four data channels), the deskew frame may comprises any number of bits. Furthermore, although described herein with respect to an aligned ten-bit data frame comprising specific bit positions, as depicted and described with respect to FIG. 3, those skilled in the art will appreciate that the methodologies of the present invention may be implemented using aligned deskew frames comprising various configurations of bit positions.

Figure 4:
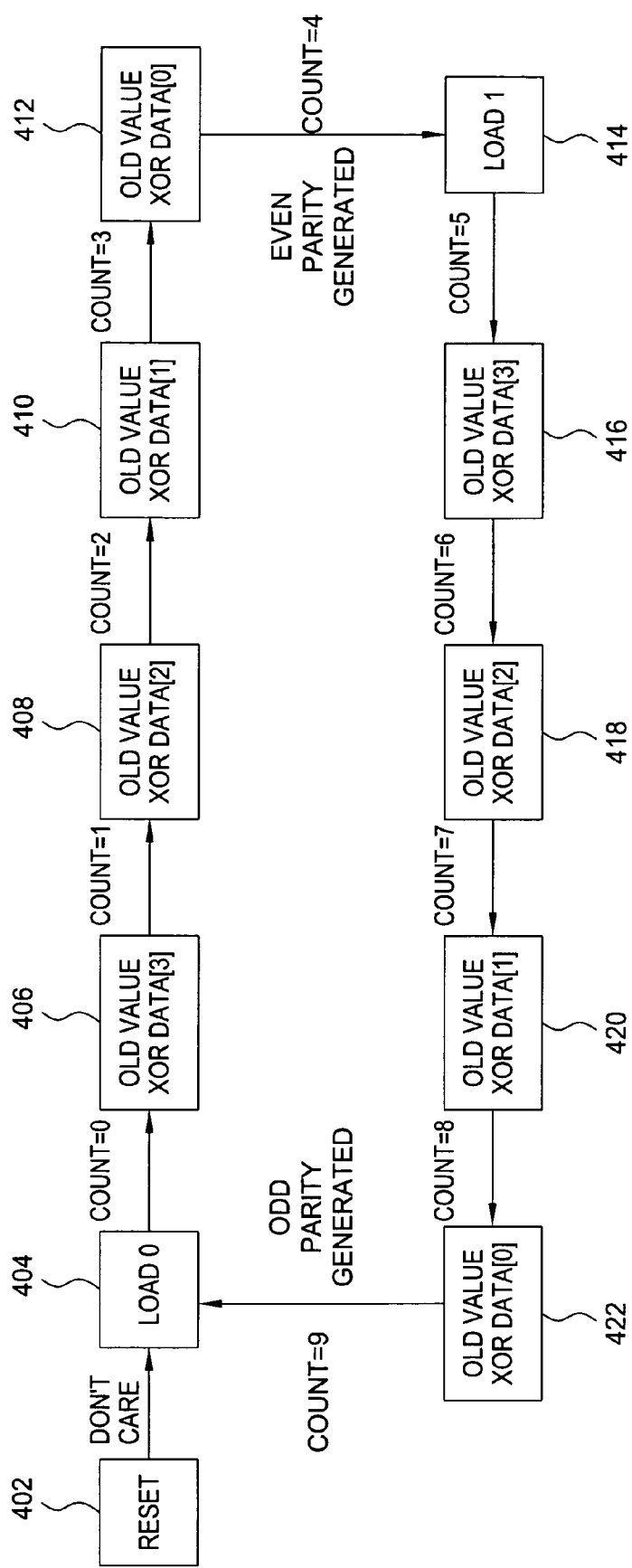
FIG. 4 depicts a flow diagram of serial alternating parity bit generation according to the parity deskew channel generation module of FIG. 2.

FIG. 4 depicts a flow diagram of serial alternating parity bit generation according to the parity deskew channel generation module of FIG. 2. The method 400 is entered at step 402 (i.e., a reset state), and proceeds to step 404. At step 404, an even parity initialization bit (illustratively, a "0" bit) is loaded for use in generating an even parity bit. A count variable is initialized to 0 (i.e., count=0). At step 406, an XOR operation is performed on the even parity initialization bit (i.e., the "0" bit) and a sampled data bit received from DC $116_3$ (denoted as data {3}). The count variable is incremented to one (count=1). At step 408, an XOR operation is performed on the resulting value from the previous step and a sampled data bit received from DC $116_2$ (denoted as data {2}). The count variable is incremented to two (count=2). At step 410, an XOR operation is performed on the resulting value from the previous step and a sampled data bit received from DC $116_1$ (denoted as data {1}). The count variable is incremented to three (count=3). At step 412, an XOR operation is performed on the resulting value from the previous step and a sampled data bit received from DC $116_0$ (denoted as data {0}). The result of this fourth XOR operation (i.e., the result of step 412) is the even parity bit associated with the four data samples from DCs $116_3$-$116_0$. The count variable is incremented to four (count=4).

At step 414, an odd parity initialization bit (illustratively, a "1" bit) is loaded for use in generating an odd parity bit. The count variable is incremented to five (count=5). At step 416, an XOR operation is performed on the odd parity initialization bit (i.e., the "1" bit) and another sampled data bit received from DC $116_3$ (denoted as data {3}). The count variable is incremented to six (count=6). At step 418, an XOR operation is performed on the resulting value from the previous step and another sampled data bit received from DC $116_2$ (denoted as data {2}). The count variable is incremented to seven (count=7). At step 420, an XOR operation is performed on the resulting value from the previous step and another sampled data bit received from DC $116_1$ (denoted as data {1}). The count variable is incremented to eight (count=8). At step 422, an XOR operation is performed on the resulting value from the previous step and another sampled data bit received from DC $116_0$ (denoted as data {0}). The result from this fourth XNOR operation (i.e., the result of step 422) is the odd parity bit associated with the other four data samples from DCs $116_3$-$116_0$. The count variable is incremented to nine (count=9). The method 400 then returns to step 404, at which point the even parity initialization bit is loaded for use in serial determination of the even parity bit as described herein. In other words, steps 404-422 depicted and described with respect to FIG. 4 are repeated for generating the alternating parity bit for inclusion in the deskew bitstream.

Although depicted in the parallel parity bit generation implementation of FIG. 3 as using both XOR and XNOR logic gates, in the sequential parity bit generation implementation the inversion of the result is performed using a "0" (for even parity bits) or a "1" (for odd parity bits) as a starting value of the sequence. Although described herein as using XOR operations for generating the even parity bit and odd parity bit, respectively, those skilled in the art will appreciate the various other logic operations may be used in accordance with the present invention for generating the even parity bit and odd parity bit. In one embodiment, the count variable is maintained using a four-bit counter (illustratively, for example, counter 212 depicted and described herein with respect to FIG. 2). Furthermore, although described herein as comprising a modulo-10 counter, those skilled in the art will appreciate that various other counters, and associated count variable processing, may be used for generating the alternating even parity bits and odd parity bits for use in synchronizing data channels in accordance with the methodologies of the present invention.

Figure 5:
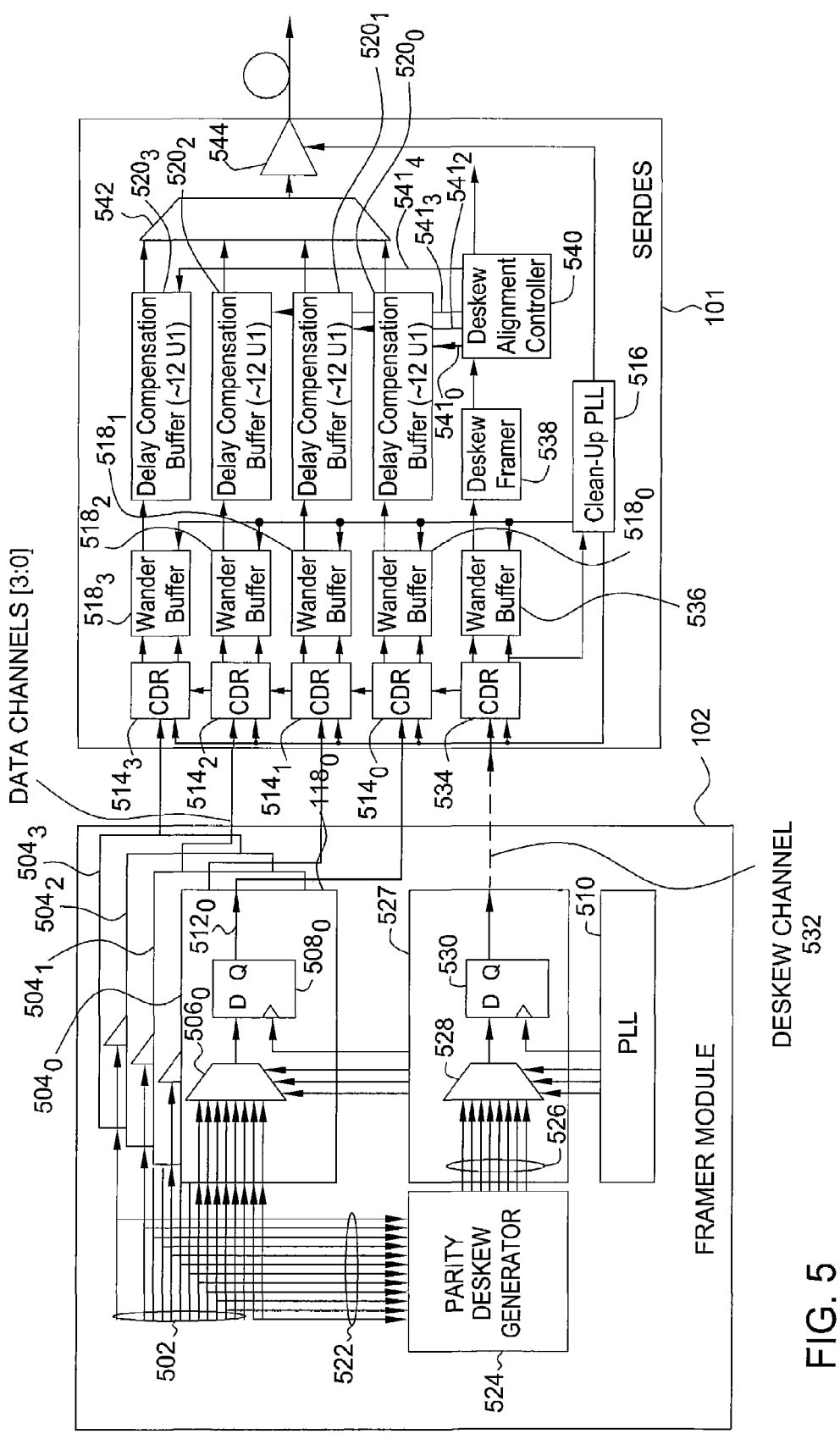
FIG. 5 depicts a high-level block diagram of a data channel alignment system including a framer module and a serializer-deserializer.

FIG. 5 depicts a high-level block diagram of a data channel alignment system including a framer module and a serializer-deserializer. Specifically, data channel alignment system 500 of FIG. 5 comprises SERDES 101 and FM 102, depicted and described herein with respect to FIG. 1. As depicted in FIG. 5, FM 102 comprises a plurality of transmit data framer modules (TDFMs) $504_0$-$504_3$ (collectively, TDFMs 504), a phase-locked loop (PLL) 510, a parity deskew generator module (PDGM) 524, and a transmit deskew framer module (TDFM) 527. As depicted in FIG. 5, SERDES 101 comprises a plurality of data clock data recovery (DCDRs) units $514_0$-$514_3$ (collectively, DCDRs 514), a plurality of data wander buffers (DWBs) $518_0$-$518_3$ (collectively, DWBs 518), a plurality of data delay compensation buffers (DDCBs) $520_0$-$520_3$ (collectively DDCBs 520), a deskew clock data recovery (DCDR) unit 534, a deskew wander buffer (DWB) 536, a deskew framer (DF) 538, a deskew alignment controller (DAC) 540, a clean-up phase-locked loop (CPLL) 516, a multiplexer (MUX) 542, and a transmitter 544.

As depicted in FIG. 5, TDFMs $504_0$-$504_3$ receive respective pluralities of switched data signals (SDS) 502, collectively, SDSs 502) from a switching core (not shown). Furthermore, at least a portion of SDSs 502 is provided to PDGM 524 using a plurality of sample data input lines (SDILs) 522 coupled to a respective plurality of input ports on PDGM 524. The PDGM 524 samples SDSs 502 for use in generating a deskew bitstream.

As depicted in FIG. 5, TDFMs $504_0$-$504_3$ comprise a plurality of multiplexers (MUXs) $506_0$-$506_3$ (collectively, MUXs 506) and a plurality of registers $508_0$-$508_3$ (collectively, registers 508). As depicted in FIG. 5, each of the MUXs 506 comprises an eight-to-one multiplexer including eight data input ports for receiving respective portions of the switched data signals 502, and one data output port for transmitting multiplexed data bitstreams towards SERDES 101. Although depicted as comprising eight-to-one multiplexers, those skilled in the art will appreciate that various other multiplexer logic may be used for implementing MUXs 506, depending on the number of data channels. The data output ports of MUXs $506_0$-$506_3$ are coupled to the data input ports of registers $508_0$-$508_3$, respectively. As depicted in FIG. 5, MUXs 506 are controlled by PLL 510 using three control signals transmitted from PLL 510 to respective control input ports on each of the MUXs 506. The multiplexed data bitstreams output from MUXs $506_0$-$506_3$ are input to registers $508_0$-$508_3$, respectively.

As depicted in FIG. 5, registers $508_0$-$508_3$ receive the multiplexed data bitstreams from MUXs $506_0$-$506_3$, respectively. Although depicted as D-type flip-flops, registers 508 may be implemented using similar storage components. The registers 508 are controlled by a clock signal generated by PLL 510 that is applied to the clock input port of each of the registers 508. The clock signal generated by PLL 510 controls the flow of data through each of the registers 508. In response to a clock signal received from PLL 510, each of the registers 508 reads out a data bit for transmission towards the respective DCDRs 514 of SERDES 101 using a respective plurality of data channels (DCs) $512_0$-$512_3$ (collectively, DCs 512). In other words, the output ports of registers $508_0$-$508_3$ are coupled to the input ports of DCDRs $514_0$-$514_3$, respectively.

The DCDRs $514_0$-$514_3$ perform data recovery functions and clock recovery functions on data bitstreams associated with DCs $512_0$-$512_3$, respectively. The DCDRs 514 are controlled by CPLL 516 using a control signal transmitted from CPLL 516 to a control input port on each of the DCDRs 514, respectively. The data signals and clock signals recovered by DCDRs $514_0$-$514_3$ from DCs $512_0$-$512_3$ are transmitted to DWBs $518_0$-$518_3$, respectively. The data output ports and clock output ports of DCDRs $514_0$-$514_3$ are coupled to the data input ports and clock input ports of DWBs $518_0$-$518_3$, respectively.

The DWBs $518_0$-$518_3$ receive the data bitstreams and the associated clock signals from DCDRs $514_0$-$514_3$, respectively. The DWBs $518_0$-$518_3$ buffer the recovered data bitstreams prior to delay compensation processing for synchronizing the respective data bitstreams. The DWBs 518 are controlled by CPLL 516 using a control signal transmitted from CPLL 516 to a control input port on each of the DWBs 518, respectively. As depicted in FIG. 5, the output ports of DWBs $518_0$-$518_3$ are coupled to the input ports of DDCBs $520_0$-$520_3$, respectively. The DWBs $518_0$-$518_3$ send the buffered data bitstreams to the DDCBs $520_0$-$520_3$, respectively, in response to the respective control signals from CPLL 516.

As depicted in FIG. 5, each of the DDCBs $520_0$-$520_3$ comprises a 12-UI selector operable for synchronizing (i.e., deskewing) the data bitstreams associated with DCs $512_0$-$512_3$, respectively. Although depicted as a 12-UI selector, those skilled in the art will appreciate that each of the DDCBs $520_0$-$520_3$ may be implemented as selectors utilizing any number of unit intervals. In other words, each of the DDCBs $520_0$-$520_3$ may be adapted for any desired amount of skew compensation according to the present invention. The DDCBs 520 are controlled by DAC 540 using a respective plurality of alignment control signals (ACSs) $541_0$-$541_3$ generated by DAC 540. The DAC 540 is controlled by the deskew bitstream generated by PDGM 524 and transmitted from FM 102 to SERDES 101 over a deskew channel 532. In one embodiment, DAC 540 and one of the DDCBs 520 operate to synchronize the data bitstream associated with that one of the DDCBs 520. For Example, DAC 540 and DDCBs $520_0$-$520_3$ operate to synchronize the data bitstreams associated with DCs $512_0$-$512_3$, respectively.

As depicted in FIG. 5, the output ports of DDCBs $520_0$-$520_3$ are coupled to respective input ports of a multiplexer (MUX) 542. The MUX 542 multiplexes the aligned data bitstreams received from DDCBs $520_0$-$520_3$, respectively. As depicted in FIG. 5, MUX 542 comprises a four-to-one multiplexer. In one embodiment, as primarily described herein, each of the four data bitstreams received by MUX 542 comprises a 10 Gbps bitstream, and the multiplexed data bitstream output by MUX 542 comprises a 40 Gbps data bitstream. Although depicted as comprising a four-to-one multiplexer, those skilled in the art will appreciate that various other multiplexer logic may be used for implementing MUX 542, depending on the number of data channels. As depicted in FIG. 5, output of the multiplexed data bitstreams by MUX 542 is controlled using control signals from CPLL 516. The output port of MUX 542 is coupled to the input port of a transmitter 544. The transmitter 544 receives the multiplexed data bitstream and transmits the multiplexed data bitstream towards an optical module (not shown) for electrical-to-optical conversion for transmission towards an associated downstream node.

As depicted in FIG. 5, at least a portion of SDSs 502 is provided to PDGM 524 using a plurality of sample data input lines (SDILs) 522 coupled to a respective plurality of input ports on PDGM 524. The PDGM 524 samples SDSs 502 for use in generating a deskew bitstream. As described herein, a deskew bitstream comprises a serial bitstream including sample bits from associated data channels and parity bits generated using the sample bits from the associated data channels. In one embodiment, the generated parity bits comprise alternating parity bits that alternate between an odd parity bit and an even parity bit. In one embodiment, PDGM 524 generates the alternating odd-even parity bits as described herein with respect to FIG. 2, FIG. 3, and FIG. 4. As depicted in FIG. 5, PDGM 524 comprises ten output ports coupled to ten input ports of DDFM 527, respectively. The PDGM 524 sends the four sample bits used for generating the odd parity bit, the odd parity bit, the four sample bits used for generating the even parity bit, and the even parity bit to TDFM 527 using an associated plurality of connections 526.

The TDFM 527 comprises a multiplexer (MUX) 528 and a register 530. As depicted in FIG. 5, MUX 528 comprises an eight-to-one multiplexer. The MUX 528 comprises eight data input ports for receiving the deskew bits and associated alternating odd-even deskew parity bits output by PDGM 524. The MUX 528 comprises three control input ports operable for receiving control signals from PLL 510. The PLL 510 controls the multiplexing of the deskew bits received from PDGM 524. The output port of MUX 528 is coupled to the input port of register 530. Although depicted as comprising an eight-to-one multiplexer, those skilled in the art will appreciate that other multiplexer logic may be used for implementing MUX 524, depending on the internal clocking speed of FM 102 (which may be 1:16, 1:32, and the like). In one embodiment, the data channels and the deskew channel employ the same rate adaptation.

The register 530 receives the deskew bitstream from MUX 528 and stores each bit of the deskew bitstream prior to transmission of the deskew bit stream over deskew channel 532. The register 530 is controlled using clock signals received from PLL 510. Although depicted as comprising a D-type flip-flop, register 530 may be implemented using similar components. The output port of register 530 (on FM 102) is coupled to an input port of DCDR 534 (on SERDES 101) using deskew channel 532. As such, FM 102 transmits the deskew bitstream to SERDES 101 for use in synchronizing the data bitstreams associated with DCs 512.

As depicted in FIG. 5, DCDR 534 receives the deskew bitstream sent by DDFM 527 over deskew channel 532. The DCDR 534 performs data recovery functions and clock recovery functions on the deskew bitstream. The DCDR 534 is controlled by CPLL 516. The data output port of DCDR 534 is coupled to the data input port of DWB 536 for providing the recovered deskew data bitstream to DWB 536. The clock output port of DCDR 534 is coupled to clock input port of DWB 536 for providing the recovered clock signal to DWB 536. Furthermore, the clock output port of CDR 534 is coupled to an input port of CPLL 516 for providing the recovered clock signal to CPLL 516. As depicted in FIG. 5, the recovered clock signal provided to CPLL 516 by DCDR 534 is used for controlling CPLL 516. Similarly, the CPLL 516 controls the flow of the deskew bitstream through DWB 536. As such, the recovered clock signal associated with the deskew bitstream is used for controlling DCDRs $514_0$-$514_3$, DWBs $518_0$-$518_3$, and MUX 542, as well as DWB 536. The DWB 536 eliminates the effects of wander on the deskew bitstream. The output port of DWB 536 is coupled to an input port of DF 538.

As depicted in FIG. 5, DF 538 receives the deskew bitstream from DWB 536. The DF 538 performs deskew parity bit matching for controlling DAC 540. The output port of DF 538 is coupled to the input port of DAC 540. As depicted in FIG. 5, DAC 540 controls each of the DDCBs 520. As such, DAC 540 controls the flow of the respective data bitstreams through the DDCBs 520 for synchronizing the respective data bitstreams for multiplexing and transmission towards an associated optical module (not shown). Although depicted as comprising a single output port, in one embodiment, DF 538 comprises a plurality of output ports for providing various data bits and control bits to DAC 540.

Although depicted as comprising a single input port, in one embodiment, DAC 540 comprises a respective plurality of input ports for receiving various data bits and control bits from DF 538 for use in synchronizing data bitstreams associated with DCs 512. As described herein, DF 538 performs deskew framing functions by performing deskew parity bit matching. The DF 538 is depicted and described herein with respect to FIG. 7 and FIG. 8. As described herein, a combination of DAC 540 and each of the respective DDCBs 520 is used for aligning the data bitstreams associated with DCs 512. A combination of DAC 540 and one of the DDCBs 520 is depicted and described herein with respect to FIG. 9 and FIG. 10.

It is contemplated that at least a portion of the functions described with respect to FIG. 5 may be combined into fewer functional elements. Similarly, it is contemplated that the various functions described with respect to FIG. 5 may be performed by other functional elements, or that the various functions may be distributed across the various functional elements in a different manner. For example, in one embodiment, at least a portion of the CDRs depicted and described with respect to FIG. 5 (e.g., CDRs 514 used in the parallel interface between FM 102 and SERDES 101) may be replaced by respective delay locked loops (DLLs). Furthermore, various functions of the present invention depicted and described with respect to FIG. 5 may be performed by replacing functional elements depicted and described with respect to FIG. 5 with various combinations of other functional elements.

Figure 6:
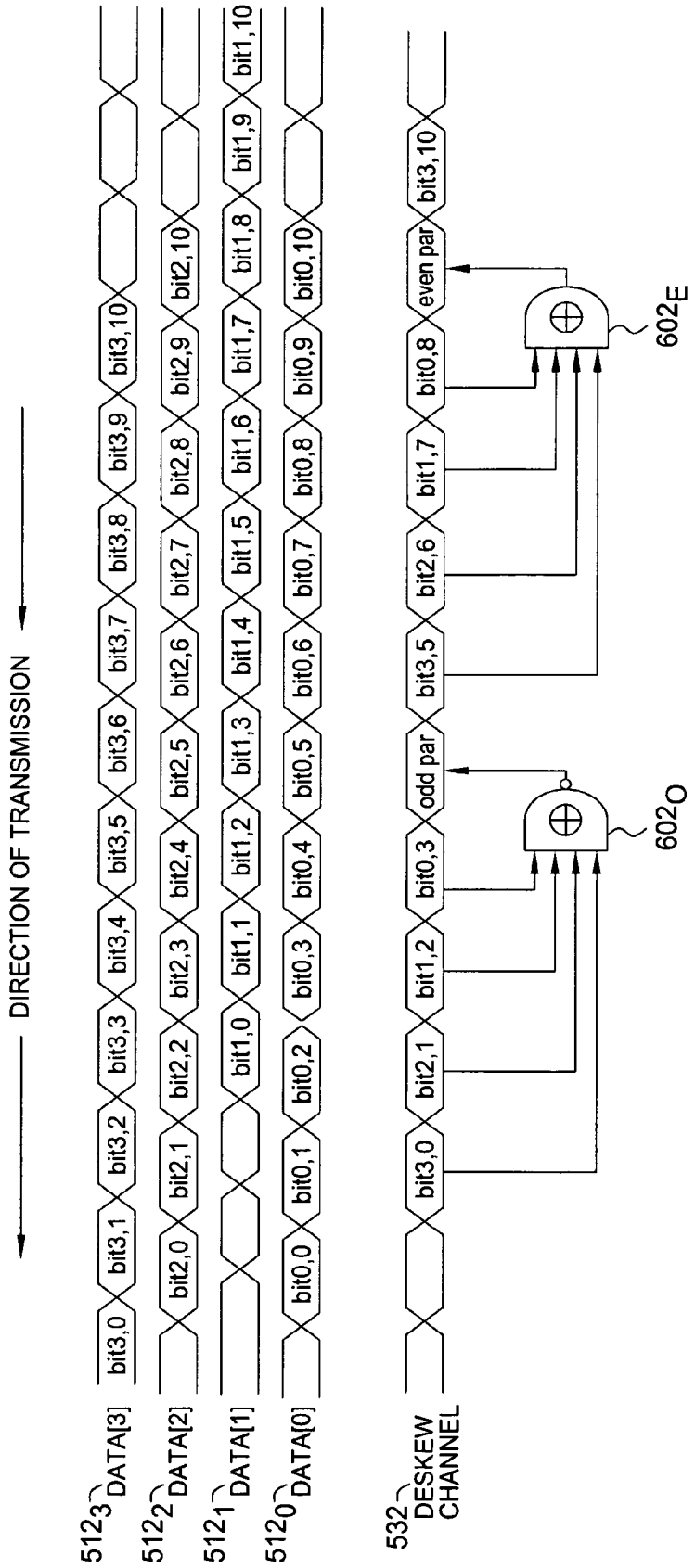
FIG. 6 depicts a logical representation of skewed data channels received by SERDES 101 of FIG. 5.

FIG. 6 depicts a logical representation of skewed data channels received by SERDES 101 of FIG. 5. As the aligned data channels (depicted and described with respect to FIG. 3) traverse the various device packages, circuit pack traces, package connectors, and like components, each of the components contributes variable delays to each of the data channels, thereby introducing skew between the data channels such that the previously aligned data channels received by SERDES 101 are no longer aligned. As such, after the aligned data channels have traversed the various components that result in the skewed data channels, at least a portion of the present invention is used for deskewing (i.e., realigning) the data channels using the deskew channel.

In particular, logical representation 600 of the skewed data channels received by SERDES 101 comprises DCs $512_0$-$512_3$ and deskew channel 532. As depicted in FIG. 6, direction of transmission (with respect to transmission over a data line) is from right to left (where clock cycle 0 is the first clock cycle). In particular, eleven bits output from the output ports of registers 508 and transmitted over respective DCs 512 are depicted. For example, the eleven data bits depicted as being transmitted over DC $512_3$ include eleven bits denoted as bit (3,0) through bit (3,10). Similarly, for example, the eleven data bits depicted as being transmitted over DC $512_2$ include eleven bits denoted as bit (2,0) through bit (2,10). Similarly, for example, the eleven data bits depicted as being transmitted over DC $512_1$ include eleven bits denoted as bit (1,0) through bit (1,10). Similarly, for example, the eleven data bits depicted as being transmitted over DC $512_0$ include eleven bits denoted as bit (0,0) through bit (0,10).

As depicted in FIG. 6, however, the respective data bitstreams associated with DCs $512_0$-$512_3$ are skewed (unlike the data bitstreams associated with DCs $116_0$-$116_3$, as depicted in FIG. 3). For example, bit (0,0) of the data bitstream associated with DC $512_0$ is no longer aligned with bit (1,0) of the data bitstream associated with DC $512_1$, bit (2, 0) of the data bitstream associated with DC $512_2$, and bit (3,0) of the data bitstream associated with DC $512_3$. Similarly, each of the other previously aligned bits of the respective bitstreams associated with DCs 512 is no longer aligned. As described herein, in one embodiment, synchronization (i.e., alignment) of the data bitstreams associated with DCs 512 is performed using DF 538 and a combination of DAC 540 and each of the DDCBs $520_0$-$520_3$ associated with DCs $512_0$-$512_3$, respectively.

Since the data bitstreams associated with DCs 512 are no longer aligned, in one embodiment, analysis and framing of the deskew bitstream is performed in a manner substantially similar to generation of the deskew bitstream as described herein with respect to FIG. 3. In one such embodiment, an odd parity bit is generated using an XNOR logic gate $602_o$ that operates in a manner substantially similar to XNOR logic gate $302_o$ depicted and described herein with respect to FIG. 3. Similarly, in one such embodiment, an even parity bit is generated by an XOR logic gate $602_E$ that operates in a manner substantially similar to the XOR logic gate $302_E$ depicted and described herein with respect to FIG. 3. The four data bits sampled for generating the odd parity bit, the odd parity bit, the four data bits sampled for generating the even parity bit, and the even parity bit comprise an aligned ten-bit deskew frame. Thus, in one embodiment, the operation of PDGM 524 is substantially similar to the operation of PDCGM 126 depicted and described herein with respect to FIG. 1.

Figure 7:
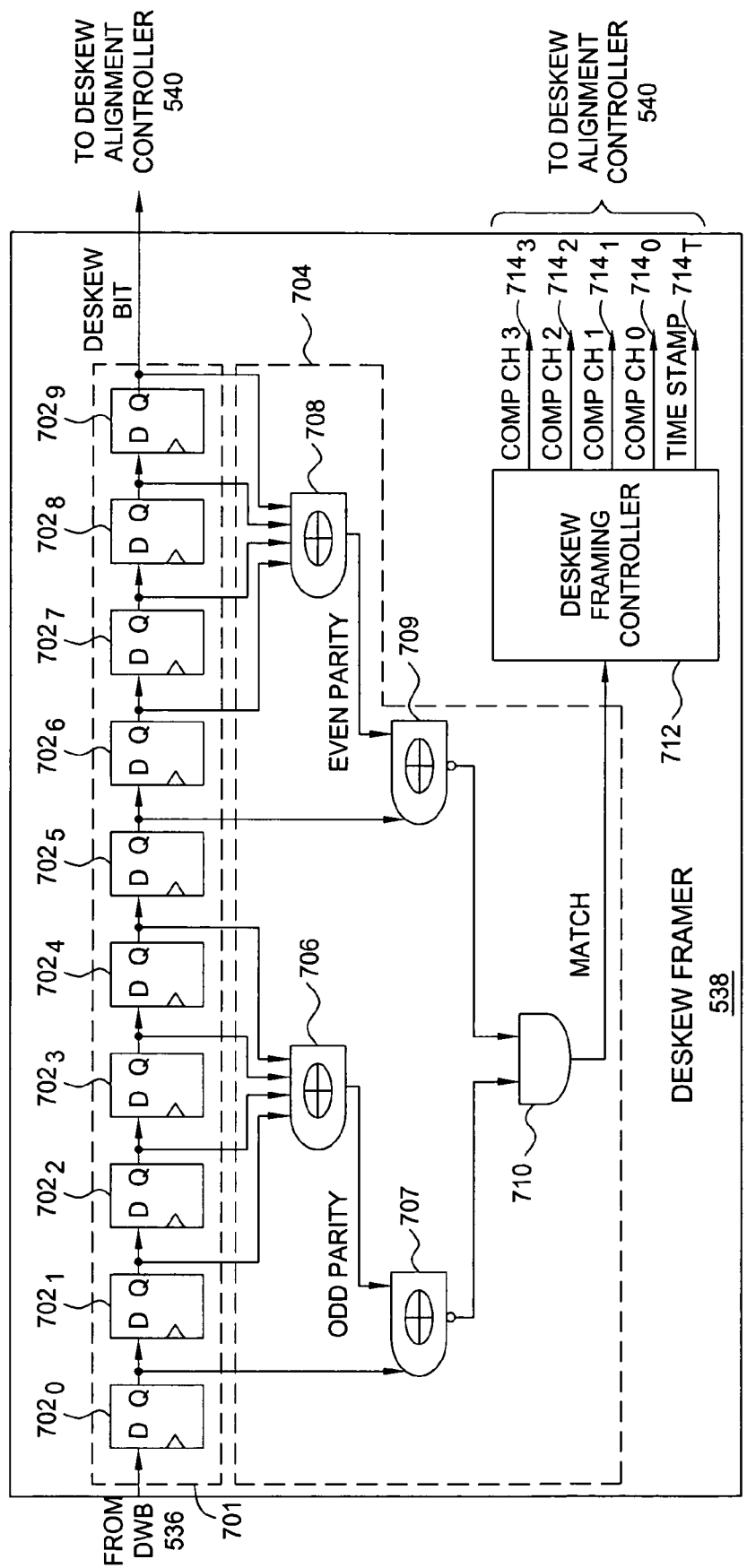
FIG. 7 depicts a high-level block diagram of the deskew framer module of FIG. 5.

FIG. 7 depicts a high-level block diagram of the deskew framer of FIG. 5. Specifically, DF 538 comprises a serial register chain (SRC) 701 including a plurality of registers $702_0$-$702_9$ (collectively, registers 702), a parity matching module (PMM) 704, and a deskew framing controller (DFC) 712. As depicted in FIG. 7, the first register in SRC 701 (illustratively, register $702_0$) receives each deskew bit in the deskew bitstream from DWB 536 (not depicted). The output port of register $702_0$ is coupled to the input port of register $702_1$, the output port of register $702_1$ is coupled to the input port of register $702_2$, the output port of $702_2$ is coupled to the input port of register $702_3$, the output port of register $702_3$ is coupled to the input port of register $702_4$, the output port of register $702_4$ is coupled to the input port of register $702_5$, the output port of register $702_5$ is coupled to the input port of register $702_6$, the output port of register $702_6$ is coupled to the input port of register $702_7$, the output port of register $702_7$ is coupled to the input port of register $702_8$, the output port of register $702_8$ is coupled to the input port of register $702_9$, and the output of register $702_9$ is coupled to an input port of DAC 540 (not shown). Furthermore, the output port of register $702_9$ is coupled to an input port of DAC 540 for providing a deskew comparison bit to DAC 540. Although depicted and described herein with respect to 12-UI compensation, the present invention may be implemented using various other unit interval compensation amounts depending on the amount of skew required to be eliminated.

The SRC 701 is operable for advancing each deskew bit in the deskew bitstream, at each clock cycle, for use in performing parity matching processing. For purposes of clarity, clock signals for synchronous logic are omitted. As such, as the deskew bits advance through the registers 702 of SRC 701, a new search window is thereby established since the bits at the respective outputs of the registers 702 change as the deskew bitstream advances through SRC 701. In other words, a new search window may be established at each clock cycle. In particular, as depicted in FIG. 7, the respective output ports of each of the registers 702 is coupled to a corresponding input port of PMM 704 for use in performing deskew parity bit matching processing. As depicted in FIG. 7, PMM 704 comprises an XOR logic gate 706, a first XNOR logic gate 707, a second XNOR logic gate 708, a third XNOR logic gate 709, and an AND logic gate 710.

With respect to odd parity processing, the output ports of registers $702_1$, $702_2$, $702_3$, and $702_4$ are coupled to respective input ports of XOR logic gate 706. The XOR logic gate 706 performs an XOR operation as known in the art. The output port of XOR logic gate 706 is coupled to a first input port of the first XNOR logic gate 707. The output port of register $702_0$ is coupled to a second input port of first XNOR logic gate 707. The first XNOR logic gate 707 performs an XNOR operation on the bit output from XOR logic gate 706 and the bit output from register $702_0$.

The output port of the first XNOR logic gate 707 is coupled to a first input port of AND logic gate 710. As such, the result of the XNOR operation performed by first XNOR logic gate 707 is provided to an associated input port of AND logic gate 710 for indicating whether the computed odd parity value and the received odd parity bit match. The odd parity value output from XOR logic gate 706 will match the received odd parity bit output from register $702_0$ when the sampled bit from DC $512_0$ is output from register $702_4$, the sampled bit from DC $512_1$ is output from register $702_3$, the sampled bit from DC $512_2$ is output from register $702_2$, the sampled bit from DC $512_3$ is output from register $702_1$, and the received odd parity bit is output from register $702_0$.

With respect to even parity processing, the output ports of registers $702_6$, $702_7$, $702_8$, and $702_9$ are coupled to respective input ports of second XNOR logic gate 708. The second XNOR logic gate 708 performs an XNOR operation as known in the art. The output port of XNOR logic gate 708 is coupled to a first input port of the third XNOR logic gate 709. The output port of register $702_5$ is coupled to a second input port of third XNOR logic gate 709. The third XNOR logic gate 709 performs an XNOR operation on the bit output from second XNOR logic gate 708 and the bit output from register $702_5$.

The output port of the third XNOR logic gate 709 is coupled to a second input port of AND logic gate 710. As such, the result of the XNOR operation performed by third XNOR logic gate 709 is provided to an associated input port of AND logic gate 710 for indicating whether the computed even parity value and the received even parity bit match. The even parity value output from second XNOR logic gate 708 will match the received even parity bit output from register $702_5$ when the sampled bit from DC $512_0$ is output from register $702_9$, the sampled bit from DC $512_1$ is output from register $702_8$, the sampled bit from DC $512_2$ is output from register $702_7$, the sampled bit from DC $512_3$ is output from register $702_6$, and the received odd parity bit is output from register $702_0$.

As described herein, the output of first XNOR logic gate 707 (used for determining whether the odd parity value computed by XOR logic gate 706 matches a received odd parity bit output from register $702_0$) is coupled to the first input port of AND logic gate 710. If both inputs to first XNOR logic gate 707 are the same (i.e., both "0" or both "1"), the output of first XNOR logic gate 707 indicates a match (i.e., a "1" is output to the first input port of AND logic gate 710). Similarly, as described herein, the output of third XNOR logic gate 709 (used for determining whether the even parity value computed by second XNOR logic gate 708 matches a received even parity bit output from register $702_5$) is coupled to the second input port of AND logic gate 710. If both inputs to third XNOR logic gate 709 are the same (i.e., both "0" or both "1"), the output of third XNOR logic gate 709 indicates a match (i.e., a "1" is output to the second input port of AND logic gate 710).

As such, the output of AND logic gate 710 provides an indication as to whether both the odd parity bit and the even parity bit received over the deskew channel 532 match. In other words, the output of AND logic gate 710 provides an indication as to whether the current ten-bit deskew frame (i.e., including the four data bits sampled for generating the odd parity bit, the odd parity bit, the four data bits sampled for generating the even parity bit, and the even parity bit) is aligned in a manner that enables further processing for synchronizing the associated data bitstreams. As such, the output of AND logic gate 710 is input to DFC 712 for controlling DAC 540 which controls the respective DDCBs 520. Although depicted and described with respect to FIG. 7 as comprising a parallel method for performing framing search processing, in one embodiment, framing search processing of the present invention may be implemented in a sequential manner or using other parallel processing methods, as well as various combinations thereof.

In one embodiment, DFC 712 comprises a three-bit state machine, a four-bit frame counter, and a six-bit time interval counter (i.e., a 64 clock cycle counter). The identification of a match condition (i.e., the output of AND logic gate 710 is a "1") starts the frame counter. In one embodiment, the frame counter comprises a modulo-ten frame counter (i.e., counting from 0 to 9). In one embodiment, two consecutive matches on the same frame position maintains the synchronous state of the deskew framing state machine. In one embodiment, two or more odd-even parity check mismatches during a 64 clock cycle time interval result in a shift of the search window by one clock cycle (i.e., by a one-bit time interval). In other words, in one embodiment, two or more odd-even parity mismatches during a 64 clock cycle time interval result in initiation of a new search for odd-even parity matches. In one such embodiment, single bit errors during the 64 clock cycle time interval on the deskew channel are ignored.

As depicted in FIG. 7, DFC 712 generates a plurality of comparison channel identifier signals (CCISs) $714_0$-$714_3$ (collectively, CCISs 714) operable for identifying DCs $512_0$-$512_3$, respectively. Although depicted as comprising simultaneous signals, only one of the CCISs $714_0$-$714_3$ is output during a particular clock cycle. Furthermore, DFC 712 generates a time stamp signal (TSS) $714_T$. In one embodiment, in which the time interval counter comprises a 64 clock cycle time interval counter, TSS $714_T$ remains equal to "0" until the sixty-fourth time interval, at which point TSS $714_T$ is set equal to "1" to identify the end of the current 64-bit time interval and trigger the start of the next 64 clock cycle time interval. The plurality of comparison pulse channels $714_0$-$714_3$ and time stamp output $714_T$ are transmitted to DAC 540 (not shown). The operation of DFC 712 is depicted and described herein with respect to FIG. 8.

Figure 8:
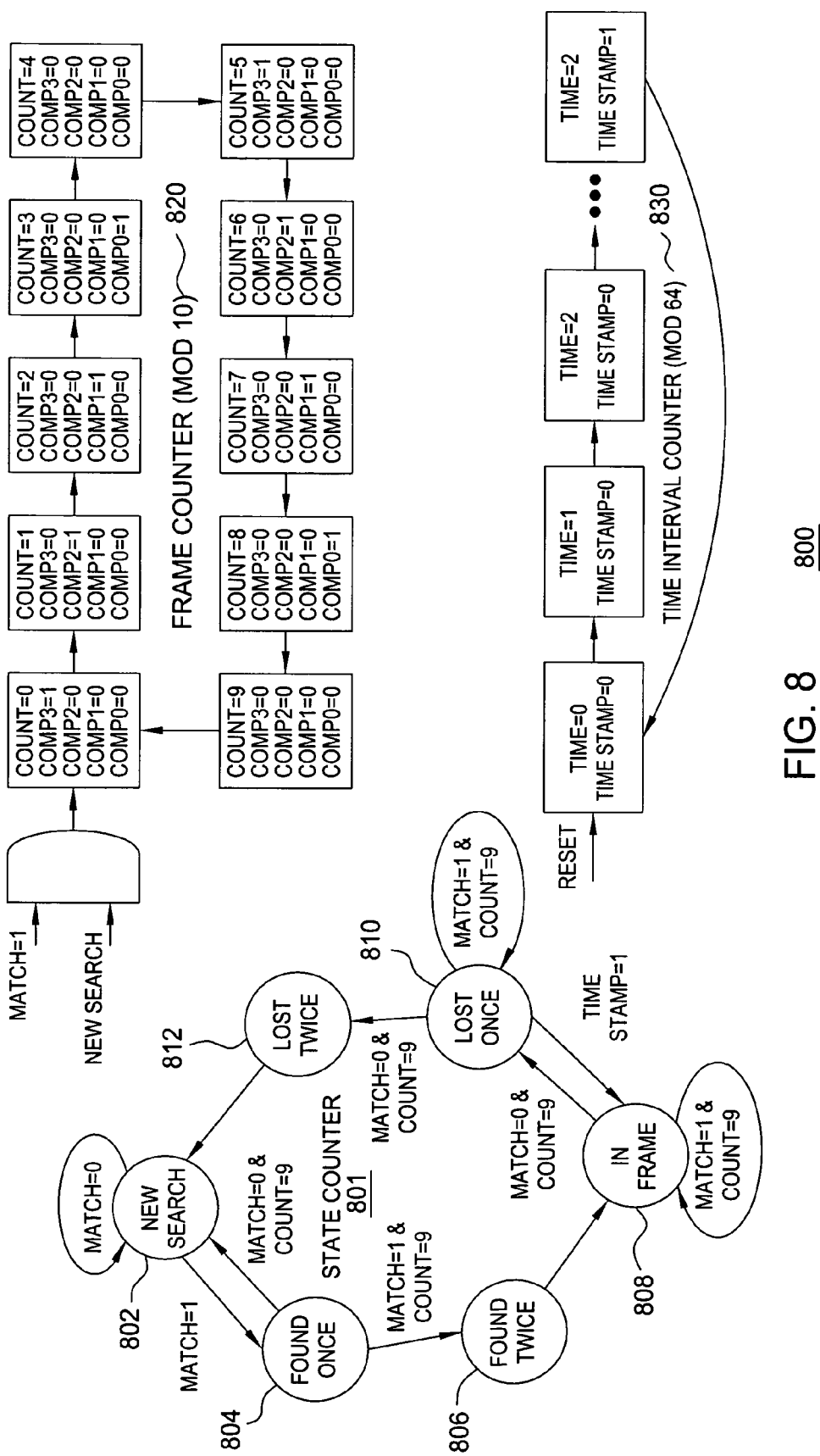
FIG. 8 depicts a flow diagram of the deskew framing controller of FIG. 7.

FIG. 8 depicts a flow diagram of the deskew framing controller of FIG. 7. Specifically, flow diagram 800 of the deskew framing controller comprises a state counter 801, a frame counter 820, and a time interval counter 830. As depicted in FIG. 8, DFC 712 is continuously receiving parity match bits from PMM 704 (i.e., the output of AND logic gate 710) depicted and described herein with respect to FIG. 7. As depicted in FIG. 8, state counter 801 begins at a NEW SEARCH state 802. If the parity match bit received by DFC 712 is zero (match="0"), state counter 801 remains in NEW SEARCH state 802. If the parity match bit received by DFC 712 is equal to one (match="1"), state counter 801 proceeds to a FOUND ONCE state 804.

As depicted in FIG. 8, if the parity match bit is equal to one (match="1") while state counter 801 is in NEW SEARCH state 802, frame counter 820 is initialized to begin modulo-10 counting from zero through nine. As depicted in FIG. 8, each frame counter state associated with frame counter 820 comprises a count variable (illustratively, count), a comparison bit associated with DC $512_0$ (illustratively, COMP0), a comparison bit associated with DC $512_1$ (illustratively, COMP1), a comparison bit associated with DC $512_2$ (illustratively, COMP2), and a comparison bit associated with DC $512_3$ (illustratively, COMP3).

As frame counter 820 cycles from count equal to zero (count=0) through count equal to four (count=4), each of the four data bits associated with DCs $512_0$-$512_3$, respectively, are selected for comparison (illustratively, COMPn=1, where n=0, 1, 2, 3), and the even parity bit generated using the four data samples associated with DCs $512_0$-$512_3$ is selected for comparison (illustratively, by setting COMPn=0, where n=0, 1, 2, 3) for each of the four comparison bits. Furthermore, as depicted in FIG. 8, a substantially similar process is implemented by frame counter 820 for comparison of the four data bits used for generating the odd parity bit and for comparison of the odd parity bit.

As depicted in FIG. 8, while state counter 801 is in FOUND ONCE state 804, if the parity match bit is equal to zero (match="0") and count is equal to nine (count=9), state counter 801 returns to NEW SEARCH state 802. Alternatively, while state counter 801 is in FOUND ONCE state 804, if the parity match bit is equal to one (match="1") and count is equal to nine (count=9), state counter 801 proceeds to a FOUND TWICE state 806. The state counter 801 then proceeds from FOUND TWICE state 806 to an IN-FRAME state 808. While state counter 801 is in IN-FRAME state 808, as long as the parity match bit equals one (match="1") and count equals nine (count=9), state counter 801 remains in IN-FRAME state 808. Alternatively, while state counter 801 is in IN-FRAME state 808, if the parity match bit is equal to zero (match="0") and count is equal to nine (count=9), state counter 801 proceeds to a LOST ONCE state 810.

While in the state counter 801 is in LOST ONCE state 810, if the parity match bit is equal to one (match="1") and count is equal to nine (count=9), state counter 801 remains in LOST ONCE state 810. Alternatively, while state counter 801 is in LOST ONCE state 810, if the parity match bit is equal to zero (match="0") and count is equal to nine (count=9), state counter 801 proceeds to a LOST TWICE state 812. The state counter 801 then returns from LOST TWICE state 812 to NEW SEARCH state 802. Furthermore, as depicted in FIG. 8, if state counter 801 is in LOST ONCE state 810 when time interval counter 830 sets TSS 714$_T$ equal to one (illustratively, time stamp=1), state counter 801 returns from LOST ONCE state 810 to IN-FRAME state 808.

Although depicted in FIG. 8 as identifying consecutive match conditions and consecutive no-match conditions using a specific number of states, those skilled in the art will appreciate that state counter 801 of DFC 712 may comprise fewer or more states, and that the states may be configured in a different manner. Although depicted in FIG. 8 as comprising a modulo-10 frame counter, those skilled in the art will appreciate that frame counter 820 may count any number of bit positions associated with deskew frames implemented according to the methodologies of the present invention depending on the number of data samples used for generating the alternating parity bits and the number of parity bits generated. Similarly, although depicted in FIG. 8 as a 64 clock cycle time interval counter, those skilled in the art will appreciate that time interval counter 830 may be implemented to count any time interval.

Figure 9:
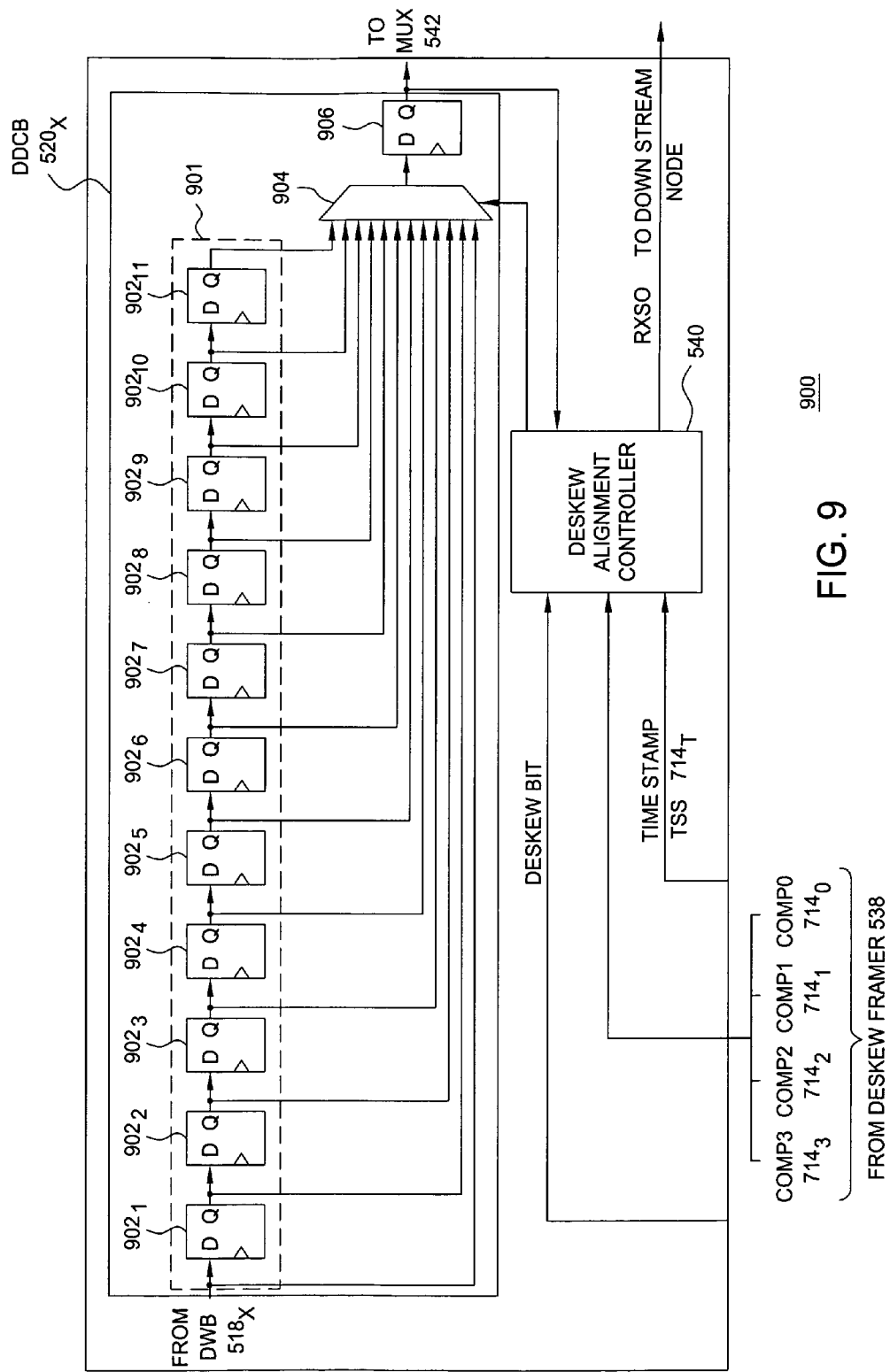
FIG. 9 depicts a high-level block diagram of a data channel alignment system for aligning one of the data channels of FIG. 5.

FIG. 9 depicts a high-level block diagram of a data channel alignment system for aligning one of the data channels of FIG. 5. Specifically, data channel alignment system 900 of FIG. 9 comprises DAC 540 and one of the DDCBs 520 (illustratively, DDCB 520$_x$, where X equals one of 0, 1, 2, or 3 depending on the data channel) depicted and described herein with respect to FIG. 5. In one embodiment, DDCB 520X comprises a twelve unit interval (12UI) selector. As depicted in FIG. 9, DDCB 520$_x$ comprises a serial register chain (SRC) 901 including a plurality of registers 902$_1$-902$_{11}$, (collectively, registers 902), a multiplexer (MUX) 904, and a register 906. For purposes of clarity, clock signals for synchronous logic are omitted.

As depicted in FIG. 9, the first register in SRC 901 (illustratively, register 902$_1$) receives each data bit in the data bitstream associated with DC 512$_x$ received from DWB 518$_x$ (not depicted). The output port of register 902$_1$ is coupled to the input port of register 902$_2$, the output port of 902$_2$ is coupled to the input port of register 902$_3$, the output port of register 902$_3$ is coupled to the input port of register 902$_4$, the output port of register 902$_4$ is coupled to the input port of register 902$_5$, the output port of register 902$_5$ is coupled to the input port of register 902$_6$, the output port of register 902$_6$ is coupled to the input port of register 902$_7$, the output port of register 902$_7$ is coupled to the input port of register 902$_8$, the output port of register 902$_8$ is coupled to the input port of register 902$_9$, and the output port of register 902$_9$ is coupled to the input port of register 902$_{10}$.

The SRC 901 is operable for advancing each data bit in the selected data bitstream, at each clock cycle, for use in performing data bitstream alignment processing. As such, as the data bits advance through the registers 902 of SRC 901, the set of bits available for selection by DAC 540 is continuously changing. In other words, a new selection set (i.e., set of data bits available for selection for comparison with an associated deskew comparison bit) may be established at each clock cycle. In particular, as depicted in FIG. 9, the input port of register 902$_1$ and the output ports of registers 902$_1$-902$_1$, are coupled to corresponding input ports of MUX 904 for making each of the data bits in DDCB 520$_x$ available for selection by MUX 904 in response to selection control signals from DAC 540. The selected bit is selected for comparison with the deskew comparison bit received by DAC 540 from register 702$_9$ (not shown).

As depicted in FIG. 9, DAC 540 receives the deskew comparison bit from register 702$_9$ of DF 538 (not shown) for use in aligning the data bitstreams. The DAC 540 receives CCISs 714$_0$-714$_3$ from DFC 712 for use in selecting data bitstream controlled by DAC 540 for the received deskew comparison bit. In particular, CCISs 714$_0$-714$_3$ determine the data channel processed by DAC 540. For example, if COMP0 714$_0$ is equal to "1", DAC 540 controls DDCB 520$_0$ (i.e., X=0). Similarly, for example, if COMP1 714$_1$ is equal to "1", DAC 540 controls DDCB 520, (i.e., X=1), if COMP2 714$_2$ is equal to "1", DAC 540 controls DDCB 520$_2$ (i.e., X=2), and if COMP3 714$_3$ is equal to "1", DAC 540 controls DDCB 520$_3$ (i.e., X=3). The DAC 540 receives TSS 714$_T$ from DFC 712 for use in controlling a select counter used by DAC for aligning the data bitstreams.

In one embodiment, DAC 540 comprises a three-bit state machine and a four-bit select counter. In one embodiment, a single central counter is used and TSS 714$_T$ may be used for distributing the central counter to each of the data channels. The identification of a match condition (i.e., the output of AND logic gate 710 is a "1") starts the frame counter. In one embodiment, the select counter comprises a modulo-twelve frame counter (i.e., counting from 0 to "1"). In one embodiment, two or more bit comparison mismatches during a 64 clock cycle time interval result in a shift of the search window by one unit interval. In other words, in one embodiment, two or more bit comparison mismatches during a 64 clock cycle time interval result in initiation of a new search window (i.e., a new bit comparison is started). In one such embodiment, single bit errors during the 64 clock cycle time interval are ignored.

In one embodiment, two consecutive bit comparison (i.e., comparing the selected bit from MUX 904 with the deskew comparison bit from DF 538) matches on the same select position maintains the synchronous state of the channel alignment state machine. As such, in one embodiment, two consecutive bit comparison matches on the same bit selection position identify a data bitstream synchronization condition indicative that the data bitstreams of the associated data channels are synchronized (i.e., aligned). In one such embodiment, a channel synchronized flag is generated (e.g., RXSO signal output by DAC 540 is set to "1") in response to a determination that the data bitstreams are synchronized (i.e., a data bitstream synchronization condition has been identified).

As depicted in FIG. 9, DAC 540 generates a control signal for selecting the comparison bit position (i.e., the bit position in the associated data bitstream in which the current comparison is performed). The output port of MUX 904 is coupled to the input port of register 906. As such, upon selecting the comparison bit position and receiving the data bit from the register associated with the comparison bit position, MUX 904 sends the selected bit to the input port of register 906. The output port of register 906 is coupled to a corresponding input port of MUX 542 (not shown). Furthermore, the output port of register 906 is coupled to an input port of DAC 540 for providing the selected bit selected in the previous clock cycle to DAC 540 for comparison with the deskew comparison bit provided to DAC 540 by DFC 712. The control signal for selecting the comparison bit position is generated by DAC 540 using a state counter and a select counter, as depicted and described herein with respect to FIG. 10.

Figure 10:
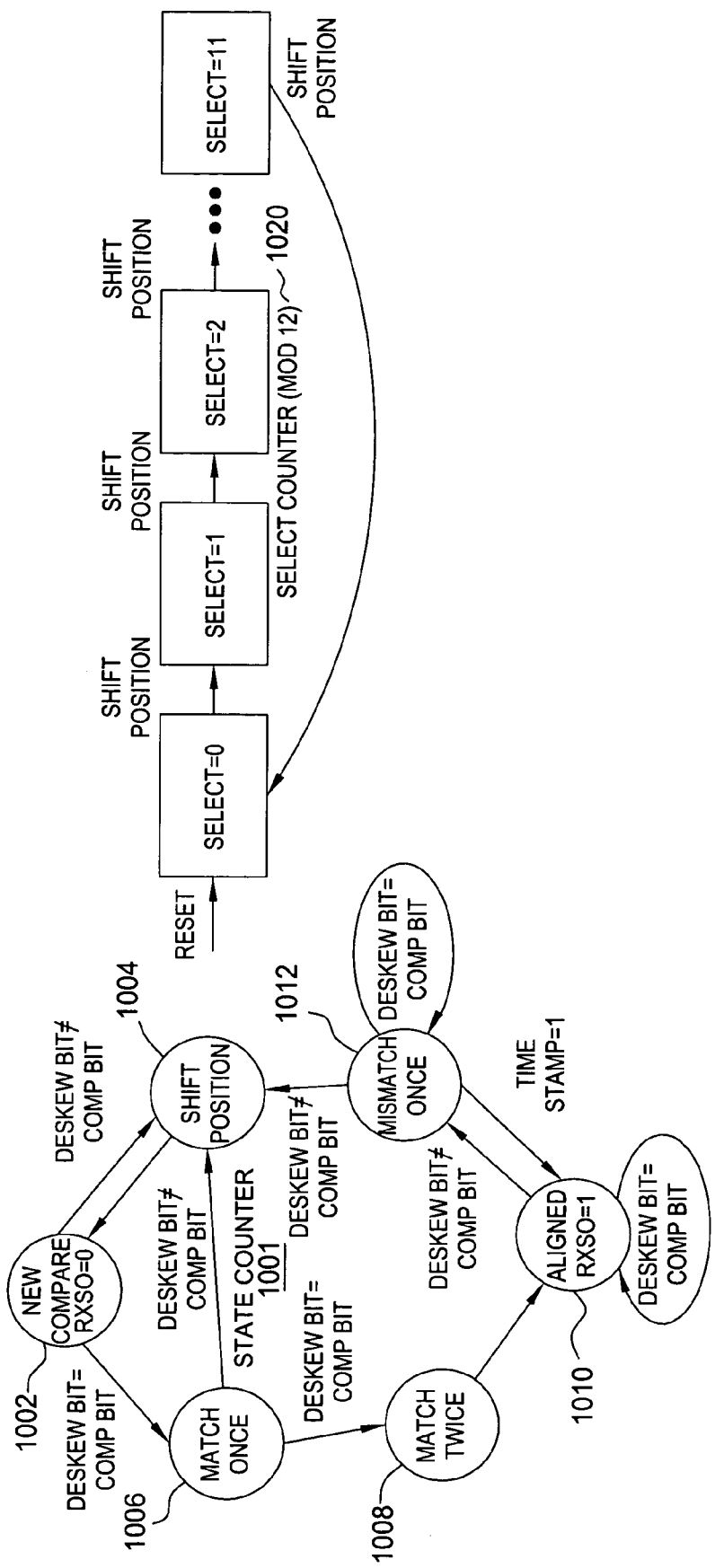
FIG. 10 depicts a flow diagram of the data channel alignment system of FIG. 9 for one of the data channels of FIG. 5.

FIG. 10 depicts a flow diagram of the data channel alignment system of FIG. 9 for one of the data channels of FIG. 5. Specifically, flow diagram 1000 of the data channel alignment system comprises a state counter 1001 and a select counter 1020. As depicted in FIG. 8, DAC 540 is continuously receiving deskew bits from DF 538 and comparison bits from $DDCB_x$, as depicted and described herein with respect to FIG. 7. Furthermore, DAC 540 is continuously receiving CCISs $714_0$-$714_3$ (denoted as COMP-N, where N is equal to one of 0, 1, 2, or 3, depending on the DDCB 520 controlled by DAC 540) from DFC 712 for use in selecting the data bitstream controlled by DAC 540 for the received deskew bit.

As depicted in FIG. 10, state counter 1001 begins at a NEW COMPARE state 1002. In one embodiment, when state counter 1001 enters NEW COMPARE state 1010, DAC 540 sets the channel synchronization flag equal to "0" (illustratively, RXSO="0"), and maintains the channel synchronization flag equal to "0" until state counter 1001 enters a state in which the associated data bitstream is aligned (i.e., a channel synchronized state). If the deskew bit and compare bit do not match (deskew bit≠compare bit), state counter 1001 proceeds to a SHIFT POSITION state 1004 that shifts the select position (by changing the control signal transmitted from DAC 540 to MUX 904 for controlling the 12UI selector). The state machine 1001 then returns to the NEW COMPARE state 1002. If the deskew bit and compare bit match (deskew bit=compare bit), state counter 1001 proceeds to a MATCH ONCE state 1006.

As depicted in FIG. 10, while state counter 1001 is in MATCH ONCE state 1006, if the deskew bit and compare bit do not match (deskew bit ≠ compare bit), state counter 1001 proceeds to SHIFT POSITION state 1004 that shifts the select position (by changing the control signal transmitted from DAC 540 to MUX 904 for controlling the 12UI selector). Alternatively, while state counter 1001 is in MATCH ONCE state 1006, if the deskew bit and compare bit match (deskew bit=compare bit), state counter 1001 proceeds to a MATCH TWICE state 1008. The state counter 1001 then proceeds to an ALIGNED state 1010. In one embodiment, while state counter 1001 remains in ALIGNED state 1010, DAC 540 maintains the channel synchronization flag equal to "1" (illustratively, RXSO="1").

As depicted in FIG. 10, while state counter 1001 is in ALIGNED state 1010, if the deskew bit and compare bit match (deskew bit=compare bit), state counter 1001 remains in ALIGNED state 1010 and channel synchronization flag remains set equal to "1" (RXSO="1"). Alternatively, while state counter 1001 is in ALIGNED state 1010, if the deskew bit and compare bit do not match (deskew bit≠compare bit), state counter 1001 proceeds to a MISMATCH ONCE state 1012. As depicted in FIG. 10, while state counter 1001 is in MISMATCH ONCE state 1012, if the deskew bit and compare bit match (deskew bit=compare bit), state counter 1001 remains in MISMATCH ONCE state 1012 and channel synchronization flag remains set equal to "1" (RXSO="1"). Alternatively, while state counter 1001 is in MISMATCH ONCE state 1012, if the deskew bit and compare bit do not match (deskew bit≠compare bit), state counter 1001 proceeds to SHIFT POSITION state 1004 that shifts the select position (by changing the control signal transmitted from DAC 540 to MUX 904 for controlling the 12UI selector). The state machine 1001 then returns to the NEW COMPARE state 1002 and channel synchronization flag is reset equal to "0" (RXSO="0"). Furthermore, as depicted in FIG. 10, if state counter 1001 is in MISMATCH ONCE state 1012 when DFC 712 sets TSS $714_T$ equal to one (illustratively, time stamp=1), state counter 1001 returns from MISMATCH ONCE state 1012 to ALIGNED state 1010.

Although depicted as performing specific state machine state changes, in one embodiment, some state changes may be triggered only if the correct comparison position is reached (e.g., every fifth cycle, depending on the valid flag for each individual data channel). In one such embodiment, information eliminated in response to various state changes may be used for marking such state changes. Although depicted in FIG. 10 as identifying consecutive bit match conditions and consecutive bit mismatch conditions using a specific number of states, those skilled in the art will appreciate that state counter 1001 of DAC 540 may comprise fewer or more states, and that the states may be configured in a different manner. Furthermore, although a single state counter 1001 is depicted, it should be noted that DAC 540 comprises one state counter for each data channel synchronized in accordance with the present invention. Although depicted in FIG. 10 as comprising a modulo-12 select counter, those skilled in the art will appreciate that select counter 1020 may count any number of bit select positions associated with the data channel synchronized using the state counter associated with that select counter.

It is contemplated that at least a portion of the described functions may be combined into fewer functional elements. Similarly, it is contemplated that various functions may be performed by other functional elements, or that the various functions may be distributed across the various functional elements in a different manner. For example, at least a portion of the functions described herein with respect to SERDES 101 may be performed by the various functional elements of FM 102 and at least a portion of functions described herein with respect to FM 102 may be performed by the various functional elements of SERDES 101. Furthermore, although primarily described herein with respect to synchronization of four 10 Gbps data channels, those skilled in the art will appreciate that the methodologies of the present invention may be used for synchronizing any number of data channels of various different rates.

Figure 11:
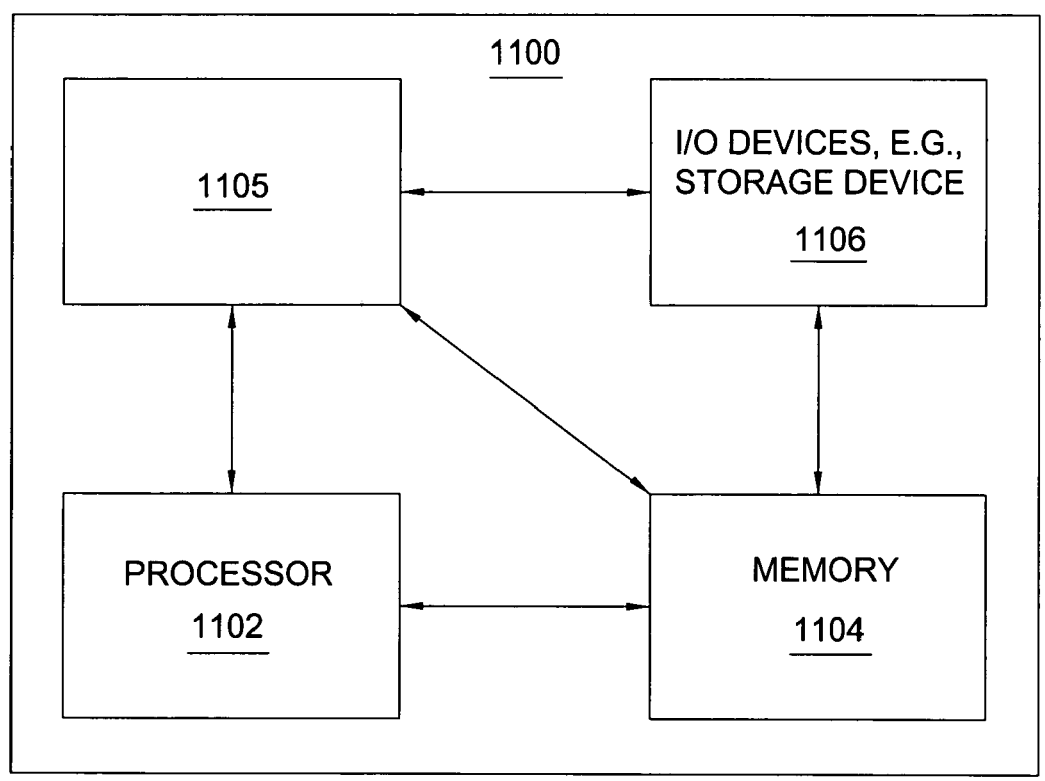
FIG. 11 depicts a high-level block diagram of a general purpose computer suitable for use in performing the functions described herein.

FIG. 11 depicts a high-level block diagram of a general purpose computer suitable for use in performing the functions described herein. As depicted in FIG. 11, system 1100 comprises a processor element 1102 (e.g., a CPU), a memory 1104, e.g., random access memory (RAM) and/or read only memory (ROM), a deskew module 1105 operable for performing various deskew bitstream generation and deskew bitstream processing and data channel synchronization functions as described herein, and various input/output devices 1106 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present deskew module or process 1105 can be loaded into memory 1104 and executed by processor 1102 to implement the functions as discussed above. As such, deskew process 1105 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for generating information adapted for use in aligning a plurality of data bitstreams, comprising:
   generating a plurality of parity bits using data samples obtained from said data bitstreams, wherein each parity bit is generated using a set of sample data bits comprising a sample data bit from each of said data bitstreams, wherein said parity bits alternate between odd and even parity bits;
   generating a deskew bitstream including said sample data bits and said parity bits generated using said sample data bits; and
   propagating said data bitstreams and said deskew bitstream toward a module adapted for substantially aligning said data bitstreams, wherein said module is adapted for substantially aligning said data bitstreams using said deskew bitstream.

2. The method of claim 1, wherein said generating said plurality of parity bits further comprises, for each pair of odd and even parity bits:
   sampling said data bitstreams for obtaining a first set of sample data bits comprising one sample data bit from each of said data bitstreams;
   processing said first set of sample data bits for determining said odd parity bit;
   sampling said data bitstreams for obtaining a second set of sample data bits comprising one sample data bit from each of said data bitstreams; and
   processing said second set of sample data bits for determining said even parity bit.

3. The method of claim 2, wherein said generating said deskew bitstream further comprises:
   inserting said sample data bits of said first set of sample data bits into said deskew bitstream;
   inserting said odd parity bit generated from said first set of sample data bits into said deskew bitstream;
   inserting said sample data bits of said second set of sample data bits into said deskew bitstream; and
   inserting said even parity bit generated from said second set of sample data bits into said deskew bitstream.

4. The method of claim 3, wherein said generating said deskew bitstream further comprises:
   inserting said odd parity bit into said deskew bitstream in a bit position immediately following said first set of sample data bits; and
   inserting said even parity bit into said deskew bitstream in a bit position immediately following said second set of sample data bits.

5. The method of claim 1, further comprising:
   receiving said data bitstreams and said deskew bitstream at said module; and
   aligning said data bitstreams at said module using said deskew bitstream.

6. The method of claim 5, wherein said aligning said data bitstreams using said deskew bitstream comprises:
   processing said deskew bitstream for controlling at least one buffer adapted for aligning said data bitstreams.

7. The method of claim 5, wherein said aligning said data bitstreams using said deskew bitstream comprises: identifying an aligned deskew frame by processing said received deskew bitstream;
   identifying a data channel alignment position associated with each of said data bitstreams by comparing a deskew channel comparison bit from said aligned deskew frame to a data channel comparison bit from each of said data bitstreams; and
   selecting said data channel alignment positions associated with said respective data bitstreams for substantially aligning said data bitstreams.

8. The method of claim 7, wherein said identifying said aligned deskew frame further comprises:
   processing a first set of sample data bits from said deskew bitstream for determining an odd parity value;
   processing a second set of sample data bits from said deskew bitstream for determining an even parity value;
   comparing said odd parity value to an associated odd parity bit from said deskew bitstream and comparing said even parity value to an associated even parity bit from said deskew bitstream; and
   generating a parity match indicator in response to a determination that said odd parity value and said odd parity bit match and that said even parity value and said even parity bit match, said parity match indicator adapted for identifying said aligned deskew frame.

9. An apparatus for generating information adapted for use in aligning a plurality of data bitstreams, comprising:
   means for generating a plurality of parity bits using data samples obtained from said data bitstreams, wherein each parity bit is generated using a set of sample data bits comprising a sample data bit from each of said data bitstreams, wherein said parity bits alternate between odd and even parity bits;
   means for generating a deskew bitstream including said sample data bits and said parity bits generated using said sample data bits; and
   means for propagating said data bitstreams and said deskew bitstream toward a module adapted for substantially aligning said data bitstreams, wherein said module is adapted for substantially aligning said data bitstreams using said deskew bitstream.

10. The apparatus of claim 9, wherein said means for generating said plurality of parity bits further comprises:
    means for sampling said data bitstreams for obtaining a first set of sample data bits comprising one sample data bit from each of said data bitstreams;
    means for processing said first set of sample data bits for determining said odd parity bit;
    means for sampling said data bitstreams for obtaining a second set of sample data bits comprising one sample data bit from each of said bitstreams; and
    means for processing said second set of sample data bits for determining said even parity bit.

11. The apparatus of claim 10, wherein said means for generating said deskew bitstream further comprises:
    means for inserting said sample data bits of said first set of sample data bits into said deskew bitstream;
    means for inserting said odd parity bit generated from said first set of sample data bits into said deskew bitstream;
    means for inserting said sample data bits of said second set of sample data bits into said deskew bitstream; and means for inserting said even parity bit generated from said second set of sample data bits into said deskew bitstream.

12. The apparatus of claim 11, wherein said means for generating said deskew bitstream further comprises:

means for inserting said odd parity bit into said deskew bitstream in a bit position immediately following said first set of sample data bits; and means for inserting said even parity bit into said deskew bitstream in a bit position immediately following said second set of sample data bits.

13. The apparatus of claim 9, wherein said module comprises:

means for receiving said data bitstreams and said deskew bitstream; and means for aligning said data bitstreams using said deskew bitstream.

14. The apparatus of claim 13, wherein said means for aligning said data bitstreams using said deskew bitstream comprises:

means for identifying an aligned deskew frame by processing said received deskew bitstream;

means for identifying a data channel alignment position associated with each of said data bitstreams by comparing a deskew channel comparison bit from said aligned deskew frame to a data channel comparison bit from each of said data bitstreams; and means for selecting said data channel alignment positions associated with said respective data bitstreams for substantially aligning said data bitstreams.

15. The apparatus of claim 14, wherein said means for identifying said aligned deskew frame further comprises:

means for processing a first set of sample data bits from said deskew bitstream for determining an odd parity value;

means for processing a second set of sample data bits from said deskew bitstream for determining an even parity value;

means for comparing said odd parity value to an associated odd parity bit from said deskew bitstream and comparing said even parity value to an associated even parity bit from said deskew bitstream; and means for generating a parity match indicator in response to a determination that said odd parity value and said odd parity bit match and that said even parity value and said even parity bit match, said parity match indicator adapted for identifying said aligned deskew frame.

\* \* \* \* \*